United States Patent

Nishida

[11] Patent Number: 6,042,364
[45] Date of Patent: Mar. 28, 2000

[54] MOLD ASSEMBLY FOR MANUFACTURING HOLLOW PARTS

[75] Inventor: Shozo Nishida, Hiroshima, Japan

[73] Assignee: The Japan Steel Works, Ltd., Tokyo, Japan

[21] Appl. No.: 09/132,777

[22] Filed: Aug. 12, 1998

Related U.S. Application Data

[62] Division of application No. 08/267,258, Jun. 29, 1994, abandoned.

[30] Foreign Application Priority Data

Jun. 29, 1993 [JP] Japan .................................. 5-158855
Jun. 22, 1994 [JP] Japan .................................. 6-139888

[51] Int. Cl.⁷ .................................................. B29C 45/04
[52] U.S. Cl. ........................... 425/574; 264/255; 425/575
[58] Field of Search ..................... 425/574, 575; 264/255

[56] References Cited

U.S. PATENT DOCUMENTS

| 3,287,485 | 11/1966 | McCord . |
| 3,348,744 | 10/1967 | Morin . |
| 4,143,452 | 3/1979 | Hakim . |
| 4,155,478 | 5/1979 | Ogi . |
| 4,261,947 | 4/1981 | Ogi . |
| 5,008,060 | 4/1991 | Kanai et al. . |
| 5,030,406 | 7/1991 | Sorenson . |
| 5,116,557 | 5/1992 | Debaes et al. . |
| 5,209,889 | 5/1993 | Brown et al. ........................... 425/575 |

FOREIGN PATENT DOCUMENTS 62-87315  4/1987  Japan .

*Primary Examiner*—Tim Heitbrink
*Attorney, Agent, or Firm*—Sughrue, Mion, Zinn, Macpeak & Seas, PLLC

[57] ABSTRACT

A method for manufacturing hollow parts using a mold assembly including a movable mold having a male die and a female die for shaping two split halves, respectively, of the hollow part and being mounted on a movable platen and a sliding mold capable of movement between two positions within a horizontally moving sliding mold guide and having a female die and a male die that face the male die and the female die, respectively, the method comprises the steps of: injecting a molten resin into a pair of cavities formed between the opposing male die and female die and between the opposing male die and female die through a primary sprue in the sliding mold, thereby forming split halves; separating the movable mold from a fixed mold together with the sliding mold guide so that a resin sprue runner portion that has solidified within the primary sprue is knocked out of the mold assembly and then sliding the mold so that the split halves left within the respective female dies will face each other; bringing the movable and sliding molds into registry with each other so that the split halves will abut against each other; and injecting a molten resin around the peripheral edges of the abutting faces through a secondary sprue in the sliding mold so that the split halves are fused to each other with the peripherally injected resin.

12 Claims, 28 Drawing Sheets

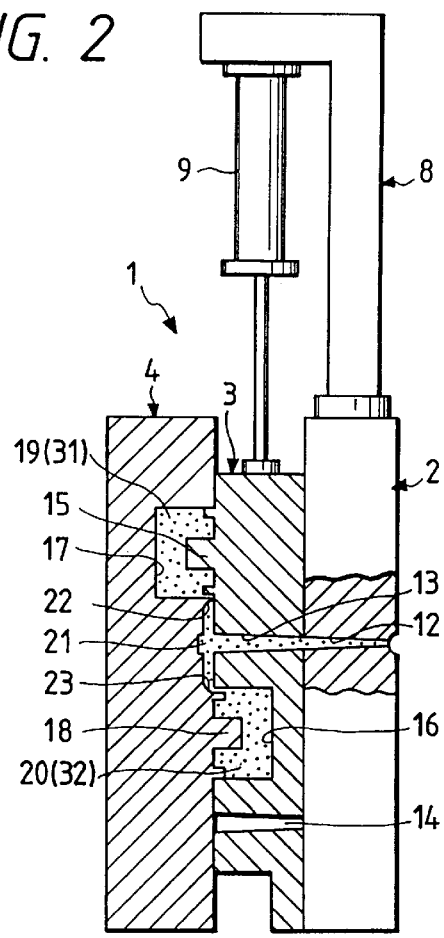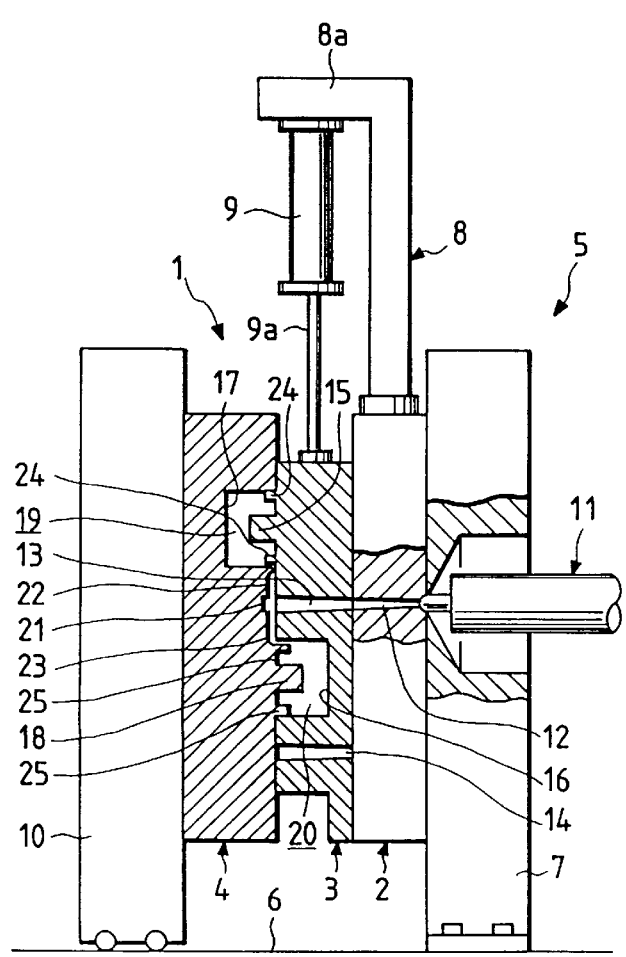

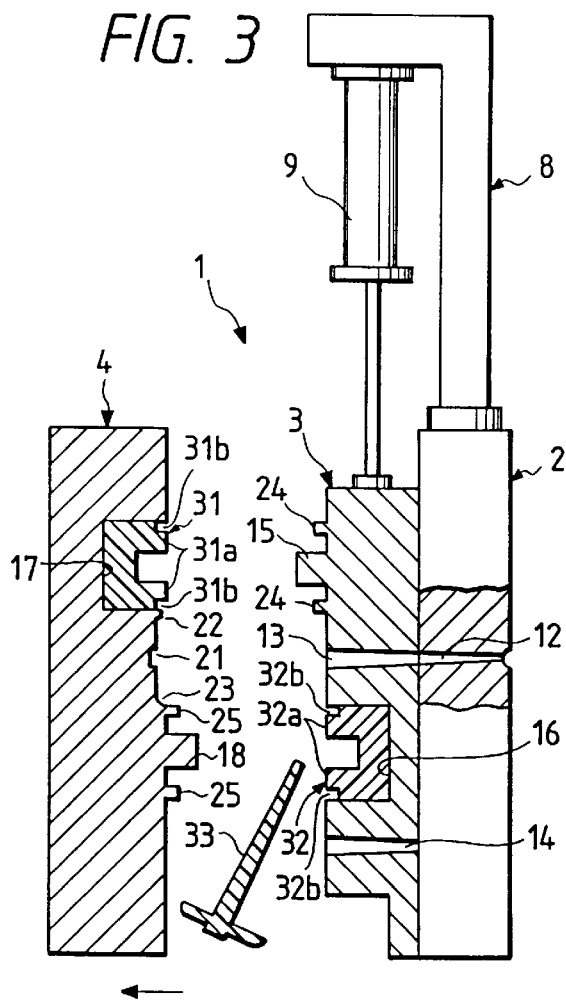
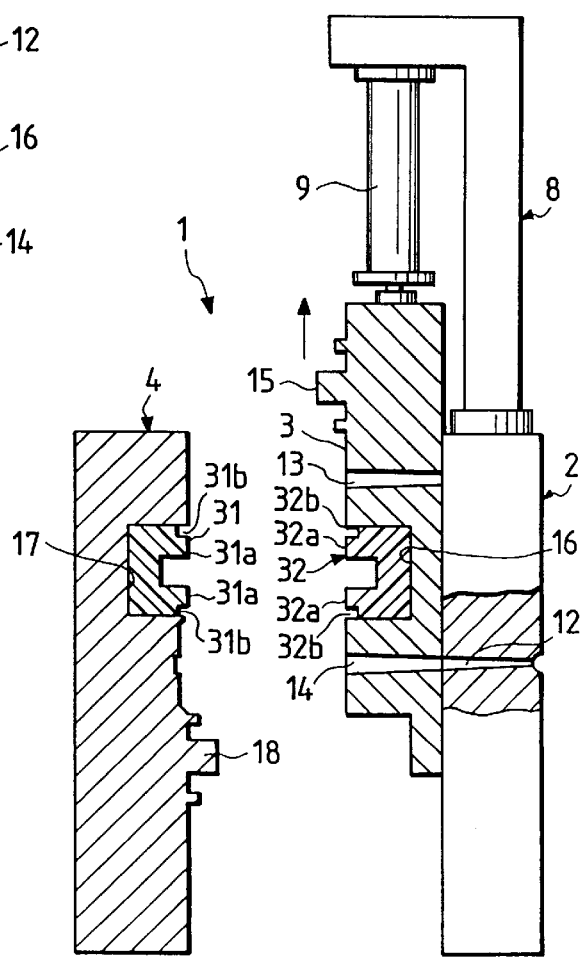

ive, are brought into abutment against each other so
MOLD ASSEMBLY FOR MANUFACTURING HOLLOW PARTS This is a divisional of application Ser. No. 08/267,258 filed Jun. 29, 1994, now abandoned, the disclosure of which is incorporated herein by reference.

BACKGROUND OF THE INVENTION

1. Field of the Invention

The present invention relates to a method of shaping hollow parts from synthetic resins, as well as a mold assembly for use in that method. In particular, the invention relates to a method and apparatus for shaping hollow parts with an injection molding machine.

2. Related Art

A conventional method of shaping hollow parts and a mold assembly for use in that method as shown in FIG. 14 is proposed (see Examined Published Japanese Patent Publication Hei 2-38377). This method and mold assembly are described below with reference to those figures.

FIG. 1 is a longitudinal sectional view showing an example of the mold assembly of the invention for shaping hollow parts. FIGS. 2 to 8 are longitudinal sectional views illustrating the method of shaping a hollow part with the mold assembly by showing its state in each step of the method.

As is clear from FIG. 1, the mold assembly generally indicated by numeral 1 is composed of a fixed mold 2, a sliding mold 3 and a movable mold 4. The fixed mold 2 is secured to a fixed platen 7 which is integral with the bed 6 of an injection molding machine 5. A support 8 having a horizontal arm 8a is erected on top of the fixed mold 2. The underside of the horizontal arm 8a is furnished with a hydraulically, pneumatically or otherwise operated sliding cylinder 9. The cylinder 9 has a piston rod 9a connected to the top of the sliding mold 3. Thus, the sliding mold 3, as it keeps adhering to the principal face of the fixed mold 2, is capable of sliding vertically between the lower position where the cylinder 9 is extended fully and the higher position where it is contracted fully.

The movable mold 4 is mounted on a movable platen 10 which is supported on the bed 6 of the injection molding machine 5 in a horizontally movable manner. The movable platen 10 is adapted to be moved back and forth with respect to the fixed platen 7 by means of a mold clamping mechanism not shown. Thus, the movable mold 4 is adapted to be moved back and forth between the mold registering position where it adheres to the sliding mold 3 and the mold opening position where it is remote from the sliding mold 3.

The fixed mold 2 has in its center a sprue 12 for guiding a molten resin injected from an injection unit 11 mounted on the fixed platen 7. The sliding mold 3 has a center sub-sprue 13 that is continuous to the sprue 12 when the sliding mold 3 is located in the lower position, as well as a lower sub-sprue 14 that is continuous to the sprue 12 when the sliding mold 3 shifts to the upper position.

The mold registering face of the sliding mold 3 has a male die 15 and a female die 16 provided in an upper and a lower position that are symmetric with respect to the center sub-sprue 13. The male die 15 will shape the inner surface of one of the split halves of the hollow part to be made, and the female die 16 will shape the outer surface of the other split half. The mold registering face of the movable mold 4 is provided with a female die 17 and a male die 18 that will face the male die 15 and the female die 16, respectively, when the sliding mold 3 is located in the lower position. The female die 17 will shape the outer surface of one split half whereas the male die 18 will shape the inner surface of the other split half. The female die 17 in the movable mold 4 is adapted to face the female die 16 in the sliding mold 3 when it is located in the upper position.

Thus, when the sliding mold 3 is located in the lower position and the movable mold 4 brought into registry with it, a pair of cavities 19 and 20 are formed between the sliding mold 3 and the movable mold 4, the cavity 19 being defined by the male die 5 and the female die 17 and the cavity 20 by the male die 18 and the female die 16. In this case, the center sub-sprue 13 in the sliding mold 3 communicates with the end edge portion of the female die 17 (or 16), namely, the cavity 19 (or 20) via a runner 21 and a gate 22 (or 23) that are formed in the movable mold 4. On the other hand, when the sliding mold 3 is located in the upper position and the movable mold 4 brought into registry with it, the female dies 16 and 17 in the sliding mold 3 and the movable mold 4, respectively, are brought into abutment against each other so that the lower sub-sprue 14 will communicate with the end edge portions of these female die 16 and 17 via the runner 21 and the gate 22 in the movable mold 4.

The peripheral edge portions of the male dies 15 and 18 are furnished with small projections 24 and 25 that are to be fitted in the peripheral edge portions of the female dies 17 and 16, respectively.

The process of shaping a hollow part using the mold assembly 1 proceeds as follows. First, the cylinder 9 is extended to locate the sliding mold 3 in the lower position. Then, the movable platen 10 of the injection molding machine 5 is moved toward the fixed platen 7 so that the movable mold 4 is in registry with the sliding mold 3. Then, as shown in FIG. 1, the center sub-sprue 13 in the siding mold 3 is continuous to the sprue 12 in the fixed mold 2, forming a pair of cavities 19 and 20 between the sliding mold 3 and the movable mold 4.

In the next step, a molten resin is injected from the injection unit 11 mounted on the fixed platen 7. The injected resin passes through the sprue 12 in the fixed mold 2 and the center sub-sprue 13 in the sliding mold 3 to be guided to both cavities 19 and 20 through the runner 21 and the gates 22 and 23, filling those cavities 19 and 20 as shown in FIG. 2. Thus, two split halves 31 and 32 of the desired hollow part are shaped in the cavities 19 and 20, respectively.

After the split halves 31 and 32 are cooled to solidify, the mold clamp unit is operated to detach the movable mold 4 from the sliding mold 3 as shown in FIG. 3. Then, the male dies 15 and 18 are disengaged from the split halves 31 and 32, which will remain in the female dies 17 and 16, respectively. In this mold opening mode, a resin sprue runner portion 33 that has solidified within the sprues 12, sub-sprue 13, runner 21, etc. in the mold assembly 1 is ejected therefrom and falls free as a result of separation in those areas of the portion 33 which correspond to the gates 22 and 23. The thus shaped split halves 31 and 32 have their end faces serve as abutting faces 31a and 32a which are to be brought into abutment against each other. Grooves 31b and 32b have been shaped in the peripheral edges of the respective abutting faces 31a and 32a by means of the projections 24 and 25 around the male dies 15 and 18.

Subsequently, as shown in FIG. 4, the cylinder 9 is contracted to shift the sliding mold 3 to the upper position. Then, the female die 16 in the sliding mold 3 faces the female die 17 in the movable mold 4 so that the split half 32 left in the female die 16 will face the split half 31 in the female die 17. In this case, the lower sub-sprue 14 in the sliding mold 3 is continuous to the sprue 12 in the fixed mold 2.

The movable mold 4 is then moved toward the sliding mold 3 so that the two members are in registry with each other as shown in FIG. 5. As a result, the abutting faces 31a and 32a of the respective split halves 31 and 32 are brought into abutment against each other, with the grooves 31b and 32b forming a space around the abutment. This space communicates with the sub-sprue 14 via the gate 22 and the runner 21.

If another shot of molten resin is injected from the injection unit 11, the injected resin passes through the sprue 12 in the fixed mold 2, the lower sub-sprue 14 in the sliding mold 3 and through the runner 21 and the gate 22, filing the peripheral edge portion of the abutment of the split halves 31 and 32 as shown in FIG. 6. The resulting peripheral resin 34 allows the two split halves 31 and 32 to fuse together.

After the peripheral resin 34 is cooled to solidity, the mold clamp unit is operated again to detach the movable mold 4 from the sliding mold 3. A hollow part 30 in which the two split halves 31 and 32 have been fused together in an abutment relationship to be completed as a totally sealed part is recovered from the mold assembly 1. In this case, a resin sprue runner portion 35 that has solidified in the sprue 12, sub-sprue 14, runner 21, etc. in the mold assembly 1 is separated from those areas of the portion 35 which correspond to the gates 22 and 23.

After recovering the hollow part 30 thusly, the cylinder 9 is extended again as shown in FIG. 8 so that the sliding mold 3 is located in the lower position. If the movable mold 4 is brought into registry with the sliding mold 3, the process returns to the first mode shown in FIG. 1 for starting the shaping of another part.

By repeating this sequence of steps, a plurality of hollow parts 30 can be shaped continuously. Since the overall shaping process is composed of simple steps (i.e., sliding the mold 3 vertically, mold registering and opening by moving the mold 4 back and forth, and injecting a molten resin), fully automation of the process can be easily accomplished. This enables the mass-production of hollow parts 30.

In the process, the two split halves 31 and 32 are first injection molded separately and then fused together in an abutment relationship; hence, the process allows for such a great degree of freedom in the wall thickness and shape of the final part 30 that even a completely sealed hollow part can be shaped. In addition, the need for deburring is substantially eliminated from the process. Further, the split halves 31 and 32 are fused by means of the mold assembly 1 and the injection unit 11 that are used to shape them and, hence, not only is the fusing step simplified but also satisfactory fusion strength can be attained.

In the example described above, it is assumed that the sliding mold 3 and the movable mold 4 form a pair of cavities 19 and 20, from which one hollow part 30 is shaped. If desired, more than one pair of cavities 19 and 20 may be formed so that a plurality of hollow parts 30 can be shaped simultaneously.

The example also assumes that the sliding mold 3 is slid vertically along the fixed mold 2. If the male dies 15 and 18 are adapted to be capable of separation or retraction, the sliding mold 3 can be designed as one that rotates around the center sub-sprue 13 to slide along the fixed mold 2. If this arrangement is adopted, only the center sub-sprue need be provided in the sliding mold 3.

Being composed in the manner described above, the prior art injection molding has had the following problems.

The shaping condition control and setting unit stores a single set of shaping conditions and, if the molds to be used alternately for shaping have the same cavity geometry, the single set of shaping conditions will suffice; however, if the molds have different cavity geometries (as in the case of molding those parts of an automotive headlamp on the right side which are symmetrical with those of an automotive headlamp on the left side), the single set of shaping conditions which may be satisfactory for one mold is certainly inappropriate for the other mold and it has been impossible to yield a shaped part that satisfies fine and subtle conditions.

Further, the conventional art method of shaping hollow parts is capable of economical mass production but, on the other hand, it employs only one injection cylinder and, hence, it has been unable to meet the requirement for changing the colors or materials of a pair of shaped halves so that one can identify the contents of the final shaped part from outside.

Further, it was found that when injecting a molten resin during secondary shaping for joining the pair of split halves, holes would potentially be made in the wall surface of the hollow part on account of the pressure or heat of the molten resin in the neighborhood of the gate, thereby increasing the chance of the molten resin of leaking through the holes to get into the hollow part. Another potential problem is that the split halves may deform under an increased injection pressure. If the injection pressure is reduced in an attempt to prevent this phenomenon, the resin will not be supplied adequately to the abutting faces of the two split halves, thereby increasing the likelihood of "short molding". A solution to the problem of "gate cutting" will facilitate the automation of the overall shaping process but, in fact, the problem of "gate cutting" persists.

The resin sprue runner portions and the shaped hollow part are recovered by pushing into the mold assembly an ejector that is provided on the side of the movable platen on which the movable mold is mounted. In general-purpose injection molding machines, the ejector is provided in one location on the side of the movable platen which faces the sprue in the mold assembly. In the production of a hollow part by the prior art technique described above, the ejector is actuated twice, the first time for recovering one resin sprue runner portion and the second time for recovering the shaped hollow and the other resin sprue runner portion. Since the conditions for the first recovery differ from those of the second recovery, problems have been encountered with the method and apparatus for these recoveries.

In certain cases, one may want to equip a single unit of injection molding machine with various kinds of molds to shape different kinds of hollow parts but the ejector problem makes it impossible to meet this need.

Further, with the recent trend for the sophistication of automobiles and other engineering products, the conditions for shaping fine details which have heretofore been entirely left out of consideration have become influential on the value of engineering products that use the parts shaped under those conditions. This situation cannot effectively be dealt with by the conventional shaping condition setting unit which is only capable of providing for a single set of conditions.

On the other hand, in the case, when an insert is provided within a hollow part during one step of the shaping process and, at the same time, adapting the pair of shaped halves to have different colors or to be made from different materials, thereby enabling one to identify or otherwise recognize the contents of the final shaped part from outside.

With hollow parts of the type contemplated by the present invention, it has been a common practice to have a shaped insert fitted in manually. To shape a single hollow part using a pair of shaped halves made either from dissimilar materials or in different colors, the method shown in FIG. 14 is typically employed. Shown by numeral 301 in FIG. 14 is the process of making a first shaped half 301a. The process 301 starts with step 301A of first mold closing and goes through step 301B of first injection and dwelling, step 301C of first cooling and plasticizing and step 301D of first mold opening and ends with step 301E of first recovery, thereby yielding the first shaped half 301a.

Sown by 302 in FIG. 14 is the process of making a second shaped half 302a. The process 302 starts with step 302A of second molding closing and goes through the 302B of second injection and dwelling, step 302C of second cooling and plasticizing and step 302D of second mold opening and ends with step 302E of second recovery, thereby yielding the second shaped half 302a.

Shown by 303 in FIG. 14 is the process in which the two shaped halves 301a and 302a are combined and a binder resin 303b is injected around the mating faces to make a single hollow part 303a. The process 303 starts with step 303A of third mold closing and goes through step 303B of third injection and dwelling, step 303C of third cooling and plasticizing, step 303D of third mold opening and step 303E of third recovery and ends with step 304 of inserting. Thus, the two shaped halves 301a and 302a are made integral to yield the hollow part 303a.

The conventional art method which is shown in FIG. 14 must use three injection cylinders and, hence, the production efficiency is too low to be suitable for achieving economical mass production.

SUMMARY OF THE INVENTION

The present invention has been accomplished under these circumstances and has as an object providing an injection molding method adapted to assure that shaping can be done via a single injection unit and cylinder, with different sets of shaping conditions being employed for a plurality of alternately used molds.

Another object of the invention is to provide an injection molding machine suitable for use in the implementation of that method.

Another object of the present invention is to provide a method of shaping a hollow part the contents of which can be identified or otherwise recognized from outside by adapting a pair of shaped halves to be made either in different colors or from different materials.

Another object of the present invention is to provide a method for shaping a hollow part from a synthetic resin in such a way that when injecting a molten resin during secondary shaping to join a pair of split halves of the desired hollow part in the peripheral edge portions, the injected resin will not leak into the hollow part, nor will the two halves deform.

Another object of the present invention is to provide a mold for shaping a hollow part form a synthetic resin which is not only free from the problem of "short molding" of the molten resin to be injected for joining purposes but also capable of cutting the gate when fusing the two split halves together by means of the molten resin.

Another object of the present invention is to provide a method of shaping hollow parts and a mold assembly for the method thereof that can be implemented with an injection molding machine having a single ejector, that permits easy recovery of resin sprue runner portions and the finally shaped hollow part, that permits the adoption of optimal gate dimensions, and which yet enables the production of various kinds of hollow parts.

According to an aspect of the present invention, an injection molding method uses a plurality of movable molds alternately to perform shaping via a single injection unit and cylinder, wherein shaping is done with different sets of shaping conditions being employed for the molds.

According to another aspect of the present invention, a fixed die in each of the molds is fixed as a die common to the molds whereas only movable dies in the molds are adapted to move alternately with respect to the common fixed die.

According to another aspect of the present invention, an injection molding machine uses a plurality of movable molds alternately to perform shaping via a single injection unit and cylinder, wherein the machine has a unit for controlling and setting plural sets of conditions that is connected to the injection unit and which provides different sets of conditions and that the machine is adapted to perform shaping with different sets of shaping conditions being employed for the molds.

Another aspect of the present invention, each of the molds has a fixed die and a movable die and is mounted on a movable platen.

Another aspect of the present invention, the fixed die is common to the molds and mounted on a fixed platen associated with the cylinder whereas only the movable dies in the molds are mounted on the movable platen facing the fixed platen.

Another aspect of the present invention, the fixed die is disposed in the upper position whereas the movable dies are disposed in the lower position.

According to another aspect of the present invention, a method of shaping a hollow part using a sliding mold provided between a fixed mold and a movable mold, the sliding mold being slid to combine a pair of shaped halves to produce a hollow part, wherein an insert having a slightly greater thickness than the thickness of a groove is fitted, as compressed, into the groove in the hollow part via an inserting means.

According to another aspect of the present invention, there is provided a method of shaping a hollow part using a sliding mold provided between a fixed mold and a movable mold, the sliding mold being slid to combine a pair of shaped halves to produce a hollow part, wherein the shaped halves have different colors or are made of different materials as they are extruded from a pair of injection cylinders and which inject feeds having different colors or being made from different materials and that the shaped halves are combined with the feed injected from either one of the injection cylinders, thereby shaping the hollow part.

According to another aspect to the present invention, there is provided that an insert having a slightly greater thickness than the thickness of a groove is fitted, as compressed, into the groove in the hollow part via an inserting means.

According to another aspect to the present invention, there is provided that a hollow part is produced by sliding a sliding mold and then combining injection molded first and second halves, wherein the hollow part further includes a first recess formed in an end portion of the first shaped half, a second recess formed in the inner surface of the second shaped half, a groove defined by the two recesses, and an insert fitted into the groove.

According to another aspect of the present invention, there is provided that a hollow part is produced by sliding a sliding mold and then combining a pair of injection molded halves that have different colors or which are made from different materials, the shaped halves being composed as an integral assembly by means of a binder resin that has the same color or which is made from the same material as either one of the shaped halves.

According to another aspect of the present invention, there is provided that hollow part has a binder resin for binding the shaped halves into an integral assembly, the shaped halves having different colors or being made from different materials, and the binder resin having the same color or being made from the same material as either one of the shaped halves.

Another aspect of the present invention, there is provided that the method of shaping a hollow part comprises: primary shaping to form a pair of halves of the final hollow part, each one half having corresponding projections and recesses in the joining end portion; injecting a molten resin into the space k defined by the projections and recesses as the two joining end portions are spaced from each other; narrowing the space to compress the injected molten resin before it solidifies; and fusing the joined portions of the pair of halves to yield the desired hollow part.

Another aspect of the present invention is provided that the method of shaping a hollow part comprises: primary shaping to form a pair of halves of the final hollow part, each one half having a recess formed in the joining end portion; bringing the respective joining end portions into abutment against each other; injecting a molten resin into a runner portion communicating with the space p defined by the recesses in the two halves; and compressing the runner portion so that the molten resin is the runner portion fills the space p, whereby the joined portions of the pair of halves are fused together to yield the desired hollow part.

Another aspect of the present invention, there is provided that a mold comprises a moving die for shaping one half of the final hollow part to be produced, a cavity plate for shaping the other half, and a movable frame supporting the cavity plate in such a way that it can be driven, the movable frame being capable of driving the cavity plate so as to effect mold clamping with respect to the moving die, with the cavity plate being also adapted to be capable of being driven towards the moving die.

Another aspect of the present invention, there is provided that a mold comprises a moving die for shaping one half of the final hollow part to be produced, a movable die not only for shaping the other half D but also undergoing mold clamping with respect to the moving die, a compressing member supported on the movable die in such a way that it can be driven in an axial direction, the movable die being provided with a runner portion communicating with the gate defined by the two halves, the runner portion being provided with the plunger portion of the compressing member in such a way that is capable of reciprocal movement.

According to another aspect of the present invention, there is provided a method for manufacturing hollow parts using a mold assembly including a movable mold having a male die and a female die for shaping two split halves, respectively, of the hollow part and being mounted on a movable platen and a sliding mold capable of movement between two positions within a horizontally moving sliding mold guide and having a female die and a male die that face the male die and the female die, respectively, the method comprising the steps of: injecting a molten resin into a pair of cavities formed between the opposing male die and female die and between the opposing male die and female die through a primary sprue in the sliding mold, a thereby forming split halves; separating the movable mold from a fixed mold together with the sliding mold guide so that a resin sprue runner portion that has solidified within the primary sprue is knocked out of the mold assembly and then sliding the mold so that the split halves left within the respective female dies will face each other; bringing the movable and sliding molds into registry with each other so that the split halves will abut against each other; and injecting a molten resin around the peripheral edges of the abutting faces through a secondary sprue in the sliding mold so that the split halves are fused to each other with the peripherally injected resin.

According to the present invention, a runner plate provided between the sliding mold and the fixed mold is removed from the fixed mold so that the resin sprue runner portion which has solidified within the primary sprue is knocked out of the mold assembly.

According to the present invention, an ejector plate provided in the movable mold on the side facing the movable platen is pushed with a single ejector so that both a resin sprue runner portion which has solidified within the secondary sprue and the shaped hollow part is knocked out of the mold assembly.

According to another aspect of the present invention, A mold assembly for shaping a hollow part comprising: a fixed mold having a single sprue, a sliding mold guide capable of horizontal movement; a sliding mold capable of movement between two positions within the sliding mold guide; a movable mold brought into registry with the sliding mold; a runner plate provided between the fixed mold and the sliding mold for horizontal movement, wherein the sliding mold has not only a male die and a female die for shaping split halves, respectively, of the hollow part but also a primary sprue and a secondary sprue that are continuous to the sprue in the fixed mold at the two positions, the movable mold has a female die and a male die which, when the sliding mold is located at one of the two positions, face the male die and the female die, respectively, in the sliding mold to form a pair of cavities, the female die being adapted to face the female die in the sliding mold when the latter has moved to the other position; the primary sprue is being adapted to communicate with the pair of cavities when it is continuous to the sprue in the fixed mold whereas the secondary sprue is adapted to communicate with the end edge portions of the female dies when it is continuous to the sprue in the fixed mold; and the male dies has projections that shape grooves around the peripheral edges of the abutting faces of the respective split halves.

According to the present invention, the mold assembly comprises: fixing means for fixing the sliding mold guide to the runner plate.

According to the present invention, the fixing means includes pins arranged in a horizontal direction to the runner plate and sliding mold guide to which the sliding mold is mounted and a pulling device having an elngated hole engaged with the pins.

According to the present invention, the mold assembly includes fixing means for fixing the runner plate to the fixing mold.

According to the present invention, the fixing means includes the pins arranged in a horizontal direction to the fixing mold and the runner plate and a pulling device having an elongated hole engaged with the pins.

According to the present invention, the movable mold includes a mold portion having the male die and the female die and an ejector box, the ejector box having a coupling portion mounted on the movable platen, an intermediate member providing a given space between the mold portion and the coupling portion, and an ejector plate provided in the space, the ejector plate having ejector pins for knocking a resin sprue runner portion and the hollow part out of the mold assembly, the resin sprue runner portio being formed by filling the abutting peripheral edge portions of the split halves with a peripherally injected resin while the hollow part is shaped by fusing the split halves and together, the ejector plate is operated by a single ejector.

According to the present invention, there is provided a method for manufacturing hollow parts using a mold assembly including two molds having the movable mold having a male die and a female die for shaping two split halves, respectively, of the hollow part and being capable of movement between two positions along a guide plate mounted on a movable platen and the fixed mold being mounted on a fixed platen and having a female die and a male die that face the male die and the female die, respectively, the method comprising the steps of: injecting a molten resin into a pair of cavities formed between the opposing male die and female die and between the opposing male die and female die, thereby shaping split halves; separating the movable mold from the fixed mold so that a resin sprue runner portion that is formed as a result of filling the pair of cavities with a molten resin is knocked out of the mold assembly and then sliding the movable mold so that the split halves left within the respective female dies will face each other; bringing the molds into registry with each other so that the split halves will abut against each other; and injecting a molten resin around the peripheral edges of the abutting faces of the respective split halves so that they are fused together with the peripherally injected resin.

According to another aspect of the present invention, there is provided a mold assembly for shaping a hollow part comprising: a fixed mold having a single sprue and being mounted on a fixed platen; and a movable mold capable of movement between two positions along a guide plate mounted on a movable platen and being adapted for registering with the fixed mold, wherein the movable mold has a male die and a female die for shaping split halves, respectively, of the hollow part and runners which are continuous to the sprue in the fixed mold at the two positions, the fixed mold has a female die and a male die which, when the movable mold is located at one of the two positions, face the male die and the female die, respectively, in the mold, the female die being adapted to face the female die in the movable mold when the latter has moved to the other position, the sprue is adapted to communicate with the end edge portions of the female dies when it is continuous to runners in the movable mold; and the male dies has projections that shape grooves around the peripheral edges of the abutting faces of the respective split halves.

According to the present invention, the movable mold includes a mold portion having the male die and the female die and an ejector box, the ejector box having a coupling portion coupled to the guide plate mounted on the movable platen, an intermediate member providing a given space between the mold portion and the coupling portion, and ejector plates provided in the space, one ejector plate having an ejector pin for knocking out of the mold assembly a resin sprue runner portion which is formed when the cavities for shaping the respective split halves are filled with a molten resin and the other ejector plate having ejector pins for knocking a resin sprue runner portion and the hollow part out of the mold assembly, the resin sprue runner portion being formed as a result of filling the abutting peripheral edge portions of the split halves with a peripherally injected resin while the hollow part is shaped by fusing the split halves together, and both ejector plates being operated with a single ejector.

According to the another aspect of the present invention, a mold assembly for manufacturing a hollow part comprising: a fixed mold having a single sprue, a sliding mold capable of movement between two positions along the fixed mold; and a movable mold brought into registry with the sliding mold, wherein the sliding mold has a male die and a female die for shaping split halves, respectively, of the hollow part and sub-sprues which are continuous to the sprue in the fixed mold at the two positions, the movable mold has a female die and a male die which, when the sliding mold is located at one of the two positions, face the male die and the female die, respectively, in the mold, the female die being adapted to face the female die in the sliding mold when the latter has moved to the other position, the sub-sprues is adapted to communicate with the end edge portions of the female dies when the sub-sprues are continuous to the sprue in the fixed mold, the male dies have projections which shape grooves around the peripheral edges of the abutting faces of the respective split halves, the movable mold includes a mold portion having the male die and the female die and an ejector box, the ejector box including a coupling portion coupled to a movable platen, an intermediate member providing a given space between the mold portion and the coupling portion, and cylinders provided in the space, one cylinder knocking out of the mold assembly a resin sprue runner portion that is formed when the cavities for shaping the respective split halves are filled with a molten resin, as well as a resin sprue runner portion that is formed as a result of filling the abutting peripheral edge portions of the split halves with a peripherally injected resin, and the other cylinder knocking out of the mold assembly the hollow part which has been shaped by fusing the split halves together.

According to the present invention, the resin sprue runner portion which has been formed as a result of filling the respective cavities with a molten resin being knocked out of the mold assembly by means of the single ejector is determined by a selector switch.

The injection molding method and machine of the invention have plural sets of shaping conditions set by the unit for controlling and setting plural sets of conditions and, therefore, by changing the set of shaping conditions for each movable mold, desired parts, say, a pair of symmetrical parts can be shaped with the set of shaping conditions being optimized for the shaping of each part. This can realize the heretofore impossible operation, that is, varying the set of shaping conditions for each of the molds in use so as to accomplish the shaping of subtly different fine details.

In accordance with the present invention, the sliding mold provided between the fixed mold and the movable mold is slid to combine two shaped halves and the insert is fitted, as compressed, into the groove in the hollow part via the inserting means; as a result, shaping and the fitting of the insert can be accomplished in one step of the shaping process. Further in accordance with the invention, feeds of different colors or materials are injected from a pair of injection cylinders into separate cavities, one being the cavity in the movable mold and the other in the sliding mold and, thereafter, the sliding mold is slid to combine the respective shaped halves, which are then joined into an integral assembly by means of the binder resin that is injected from either one of the injection cylinders, thereby producing the hollow part which is the combination of the two shaped halves having different colors or being made from different materials.

According to the present invention, the structural features described above is operated in the following manner. One half of the final hollow part to be produced is shaped in the moving die and the other half is shaped in the cavity plate. The thus shaped halves have corresponding projections and recesses in their joining end portions, for example, projections and projections and a recess. In the next step, the moving die is brought into registry with the cavity plate, whereupon the projections and recesses in one half are spaced from the corresponding projections and recesses in the other half. The movable frame is then driven to effect mold clamping. Subsequently, a molten resin is injected into the space defined by the projections and recesses in the joining end portions, and the cavity plate is driven before the injected molten resin solidifies. As a result, the space into which the molten resin has been injected becomes narrow enough to compress the molten resin, whereby the joined portions of the pair of halves are fused together on the periphery to yield the desired hollow part.

According to ther present invention, first, two halves of the hollow part to be produced are shaped in the moving die and the movable die 31, respectively. The thus shaped halves each have a recess formed in the joining end portion. The moving die or movable die, with the halves being fitted in the dies, respectively, is moved until the recesses in the joining end portions of the halves abut against each other. Subsequently, the movable frame is driven toward the moving die to effect mold clamping.

In the next step, a shot of molten resin is injected into the runner portion, which communicates with the gate which is defined by the recesses in the joining end portions of the two halves. The injection of the resin is then ceased and the compressing member is driven before the injected resin cools to solidify. As a result, the plunger portion of the compressing member is driven forward in the runner portion and its space is narrowed to eventually become zero. As a consequence, the molten resin is pushed through the gate into the spaces of the recesses in the joining end portions of the two halves, which hence are fused together in the joint.

According to the present invention, the resin sprue runner portion that has solidified within the primary sprue knocked out of the mold assembly by means of the runner plate provided between the sliding mold and the fixed mold whereas the ejector plate provided in the movable mold on the side facing the movable platen is pushed with a single ejector, whereby the resin sprue runner portion that has solidified within the secondary sprue, as well as the hollow part shaped by fusing the split halves together are knocked out of the mold assembly.

According to the present invention, two ejector plates are used, one for knocking out of the mold assembly the resin sprue runner portion that is formed when the cavities for shaping the respective split halves is filled with a molten resin, and the other for knocking out of the mold assembly the resin sprue runner portion that is formed as a result of filling the abutting peripheral edge portions of the split halves with a peripherally injected resin, as well as the hollow part that is shaped by fusing the two split halves together. Both ejector plates are operated with a single ejector.

According to the present invention, two cylinders are used, one for knocking out of the mold assembly the resin sprue runner portion that is formed when the cavities for forming the respective split halves are filled with a molten resin, as well as the resin sprue runner portion that is formed as a result of filling the abutting peripheral edge portions of the split halves with a peripherally injected resin, and the other cylinder for knocking out of the mold assembly the hollow part that is shaped by fusing the two split halves together. In this particular case, no ejectors are used.

According to the present invention, determination as to whether or not the resin sprue runner portion that has been formed as a result of filling the respective cavities with a molten resin should be knocked out of the mold assembly by means of the single ejector is made via a selector switch.

BRIEF DESCRIPTION OF THE DRAWINGS

FIG. 1 is a side view showing in longitudinal section an example of the mold assembly of the conventional art for shaping a hollow part, together with the essential part of an injection molding machine;

FIGS. 2 to 8 are side views illustrating in longitudinal section the method of the conventional art for shaping a hollow part by showing the state of the mold assembly and resin in successive steps of the shaping process;

DETAILED DESCRIPTION OF THE PREFERRED EMBODIMENTS

First Embodiment

A first embodiment of the injection molding method and machine of the invention is described below in detail with reference to the accompanying FIG. 9.

Figure 5:
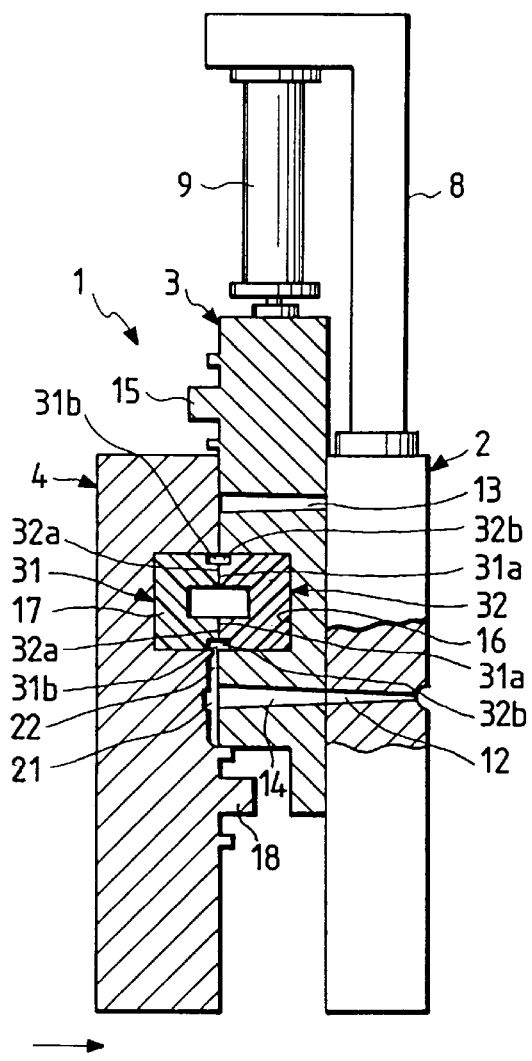
Figure 6:
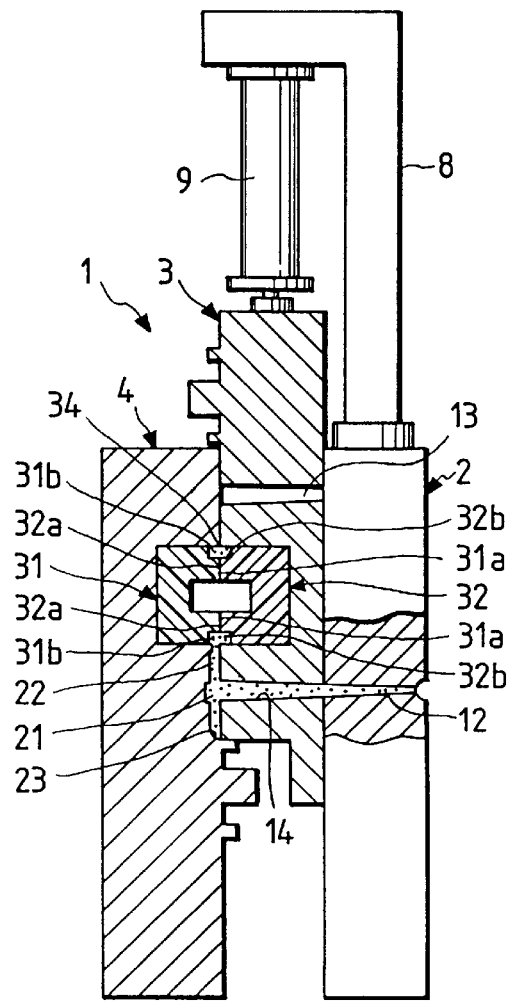
Figure 7:
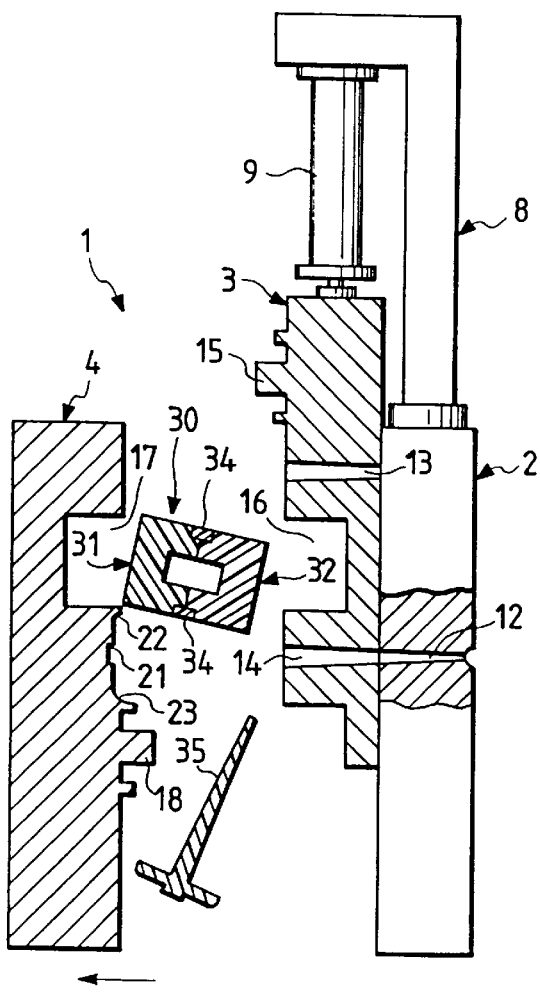
Figure 8:
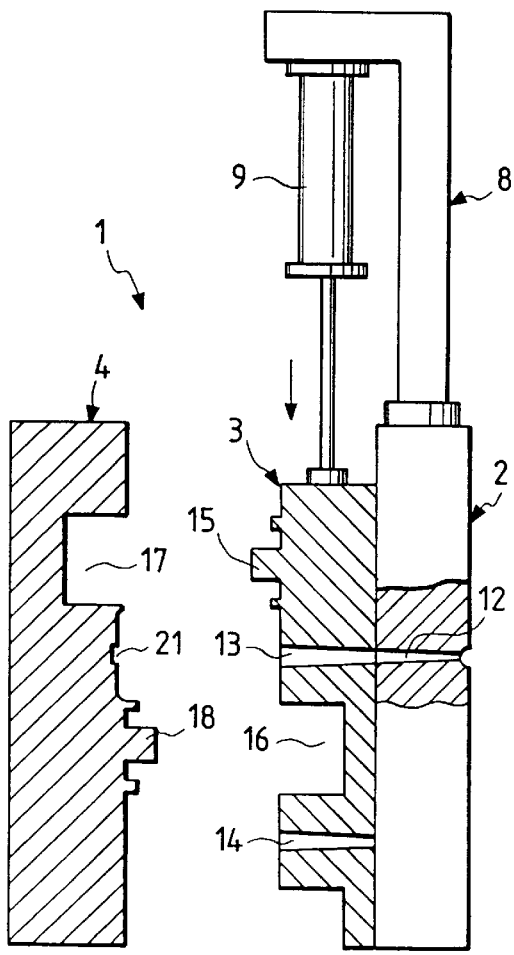
Figure 9:
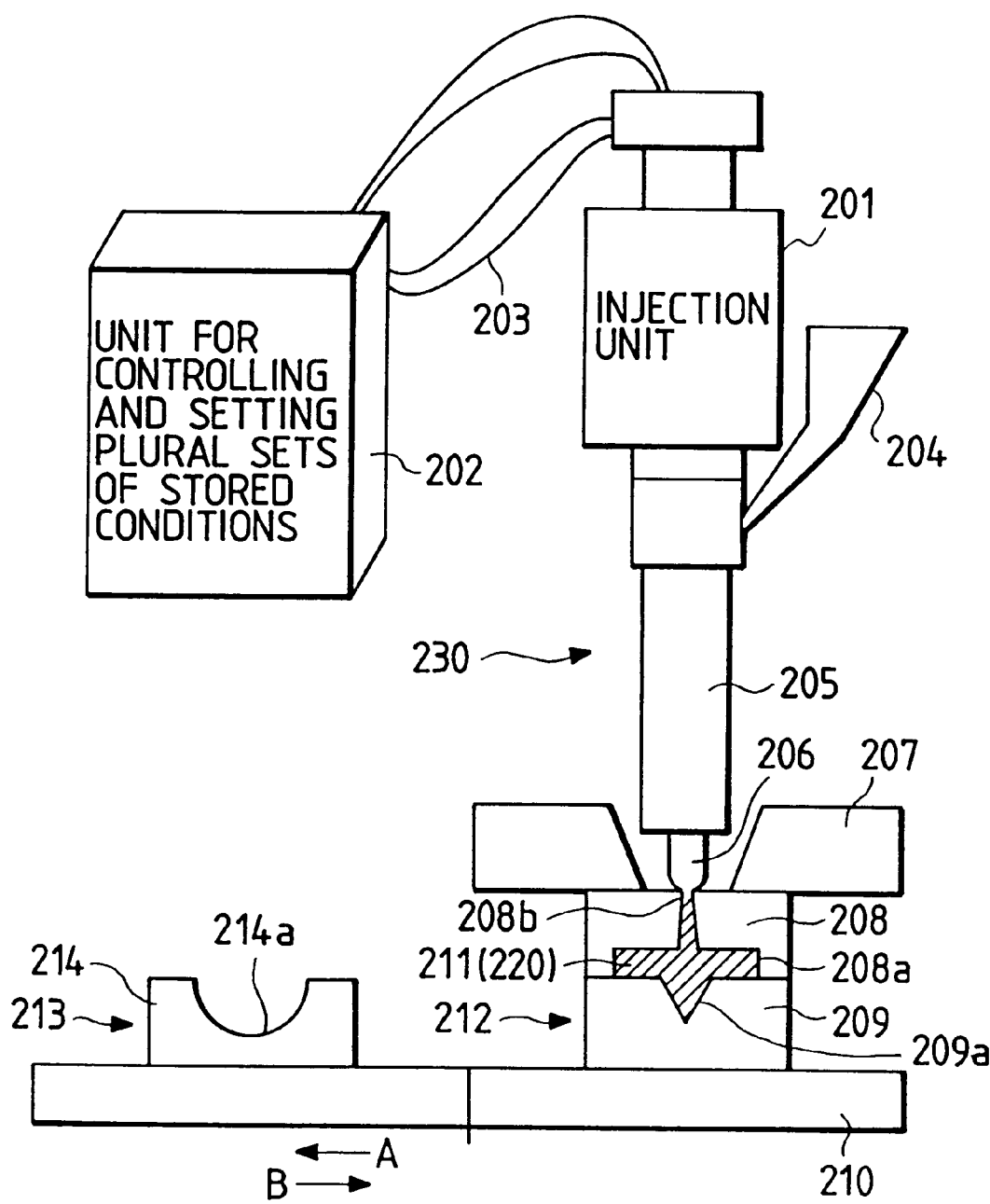
FIG. 9 is a schematic view of a first embodiment of the injection molding machine of the present invention.

Shown by numeral 201 in FIG. 9 is an injection unit and a unit 202 for controlling and setting plural sets of stored shaping conditions is connected to the injection unit 201 via a cable 203.

The injection unit 201 is connected to a cylinder 205 which in turn is connected to a hopper 204. A nozzle 206 on the cylinder 205 communicates with a gate 208b leading to a fixed cavity 208a in a fixed die 208 which is an upper die mounted on a fixed platen 207. The fixed die 208 is common to the two molds used in the example.

Below the fixed platen 207, a movable platen 210 having a first movable die 209 which is a lower die is mounted movably in the directions of arrows A and B. A first movable cavity 209a in the movable die 209 communicates with the fixed cavity 208a to form a mold cavity 211.

The fixed die 208 and the first movable die 209 combine to form the first mold 212. A second movable die 214 for making the second mold 213 is fixed in a position spaced from the first movable die 209 on the movable platen 210 and a second movable cavity 214a in the second movable die 214 communicates with the fixed cavity 208a. The movement of the platen 210 is not limited to the above-mentioned linear reciprocating motion and it may be replaced by a rotating disk not shown.

Let us describe how injection molding is actually performed via the single injection unit 201 and cylinder 205 using the two molds 212 and 213 alternately in the system of the example.

First assume that the movable platen 210 takes the position shown in FIG. 9. The first set of shaping conditions to be satisfied by the part to be shaped with the mold cavity 211 in the first mold 212 are delivered from the control and setting unit 202 so that the injection unit 201 is controlled by the output of the first set of shaping conditions.

Accordingly, the overall shaping process consists of mold closing with a clamp unit (not shown), injection and dwelling under the first set of shaping conditions, mold cooling, mold opening and ejection. After the end of first shaping cycle with the first mold 212, the movable platen 210 is moved in the direction of arrow B by a moving means (not shown), whereupon the second movable die 214 is moved to the position taken by the first movable die 209 in FIG. 9, thereby forming a second cavity 220.

In operative association with the movable platen 210, the second set of shaping conditions stored in the unit 202 are supplied to the injection unit 201 and the overall process consists of mold closing with the clamp unit (not shown), injection and dwelling, cooling, mold opening and ejection which completes the second shaping process with the second mold 213.

Thus, as well as repeating the two shaping processes described above, the operator may change the set of shaping conditions for the respective molds 212 and 213 via the single injection unit 201 and cylinder 205, whereby shaping can be accomplished as desired within the cavities 211 and 220 in the respective molds 212 and 213 on the basis of optimal sets of shaping conditions. In the case of shaping parts of automotive headlamps, those of the lamp on the right side and those for the left side can be shaped in the first and second molds 212 and 213, respectively, under optimal sets of shaping conditions.

The foregoing description concerns the case where the fixed die 208 is common to the molds 212 and 213 whereas only the pair of movable dies 209 and 214 are mounted on the movable platen 210. However, this is not the sole case of the invention and, if desired, each of the molds 212 and 213 may consist of the combination of a fixed die and a movable die so that each mold is movable by means of the platen 210 without using common fixed die 208. In this modified case, the operation described above in connection with the example can be realized.

In the example shown in FIG. 9, the fixed die 208 and the movable die 209 are disposed in the upper and lower positions, respectively, thereby constructing a vertical injection molding machine 230. Needless to say, this is not the sole case of the invention and its basic idea is also applicable to a well-known horizontal injection molding machine. The foregoing description of the example concerns the case of using two molds but more than two molds may of course be employed.

Second Embodiment

A second embodiment of the present invention as it relates to a method of molding a hollow part and the hollow part that is produced by the method is described below in detail with reference to FIGS. 10 to 13.

Figure 14:
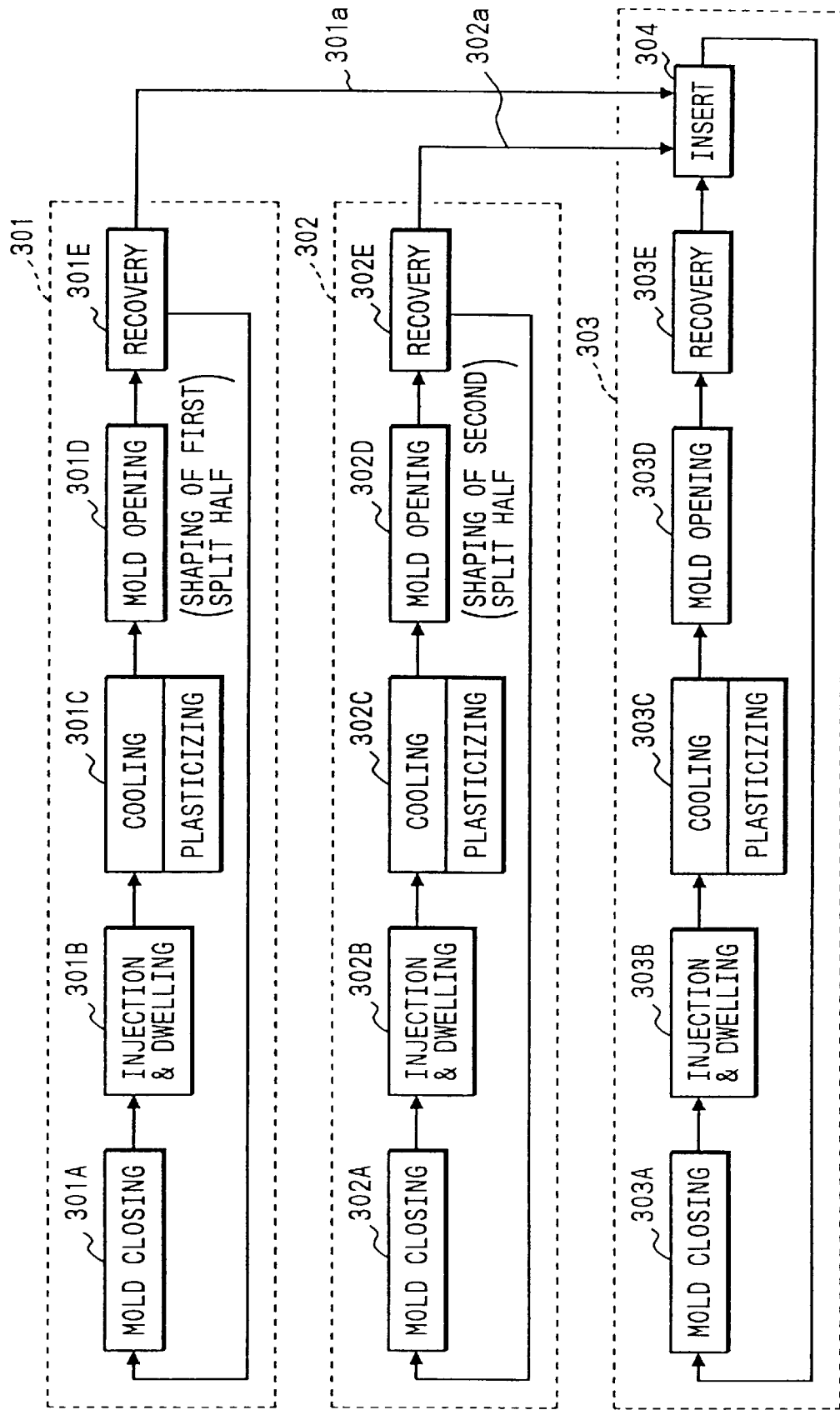
FIG. 14 is a flowsheet showing a prior art method of shaping hollow parts

In the following description, the portion that are the same as or equivalent to those of the conventional art which are shown in FIG. 14 are identified by like numerals.

Figure 10:
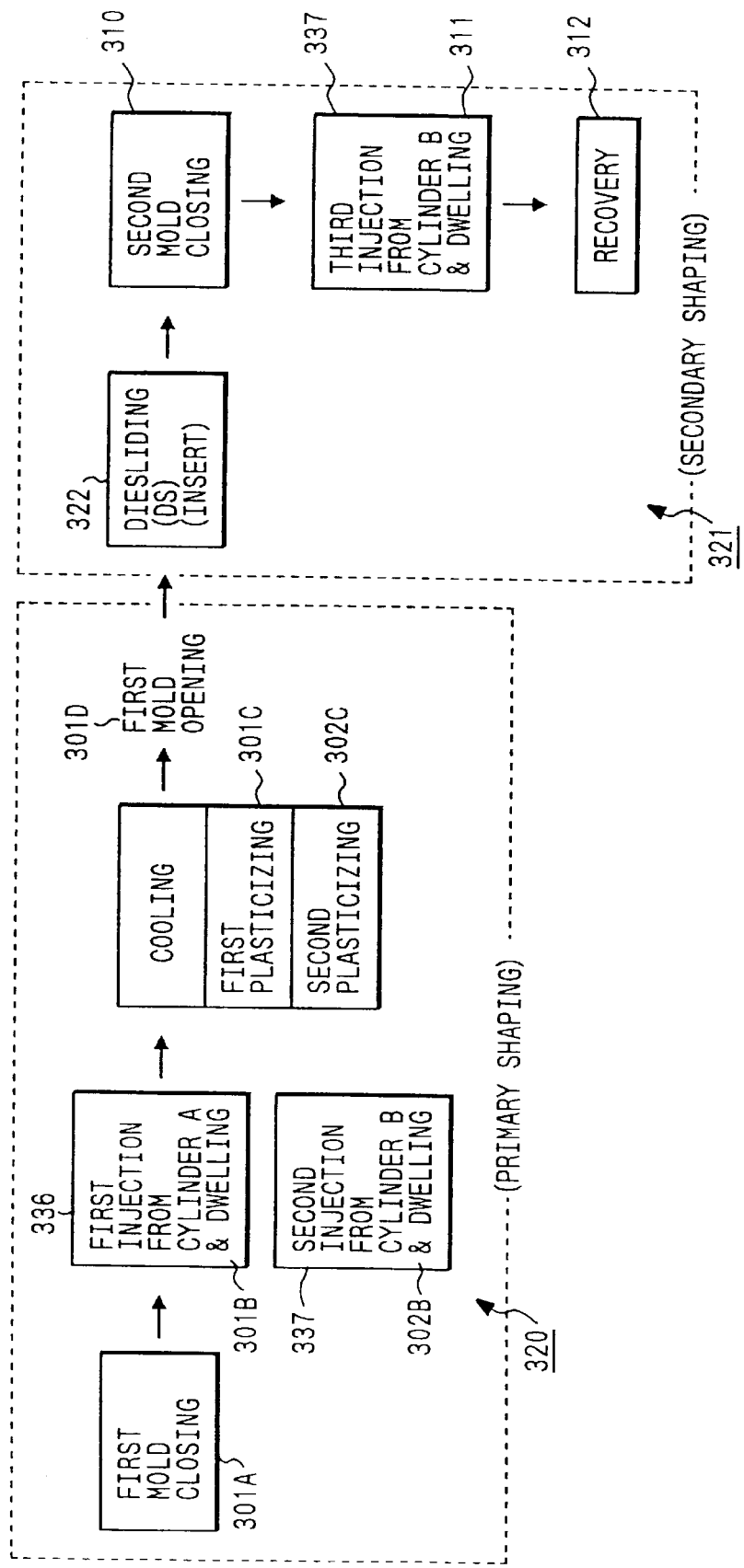
FIG. 10 is a flowsheet showing the method of the present invention for shaping hollow parts.
Figure 11:
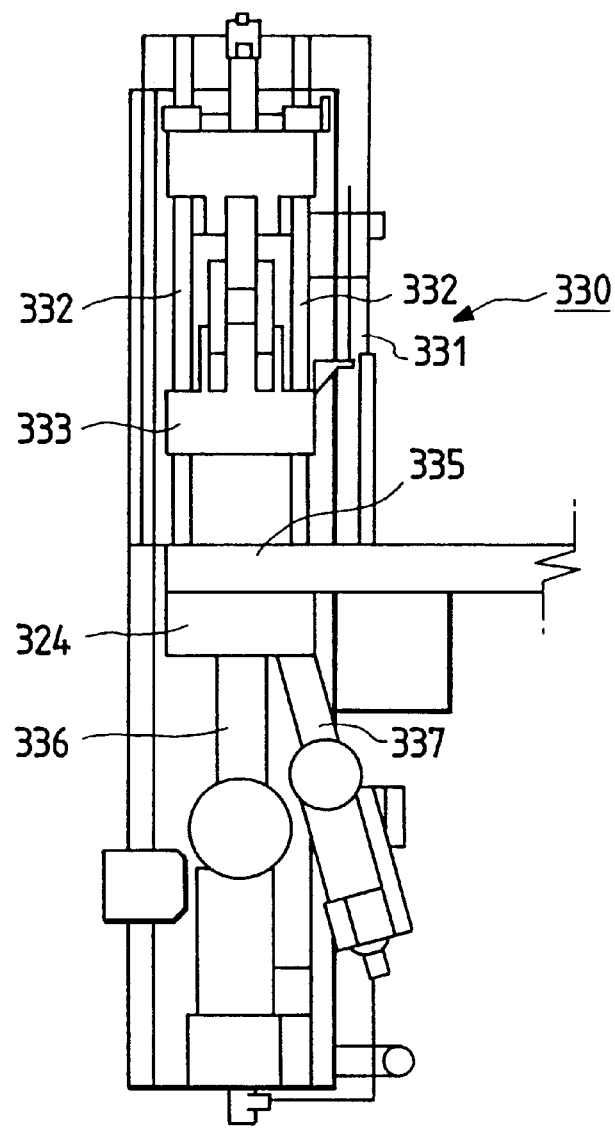
FIG. 11 is a schematic diagram of an injection molding machine.
Figure 13:
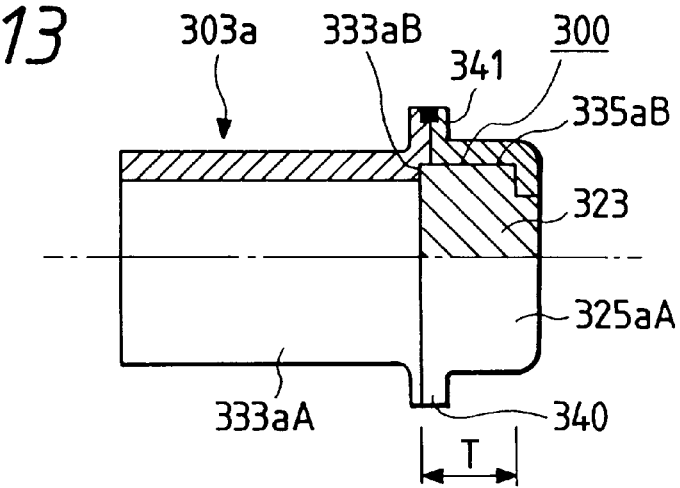
FIG. 13 is a section of the hollow part to be shaped by the invention.
Figure 12:
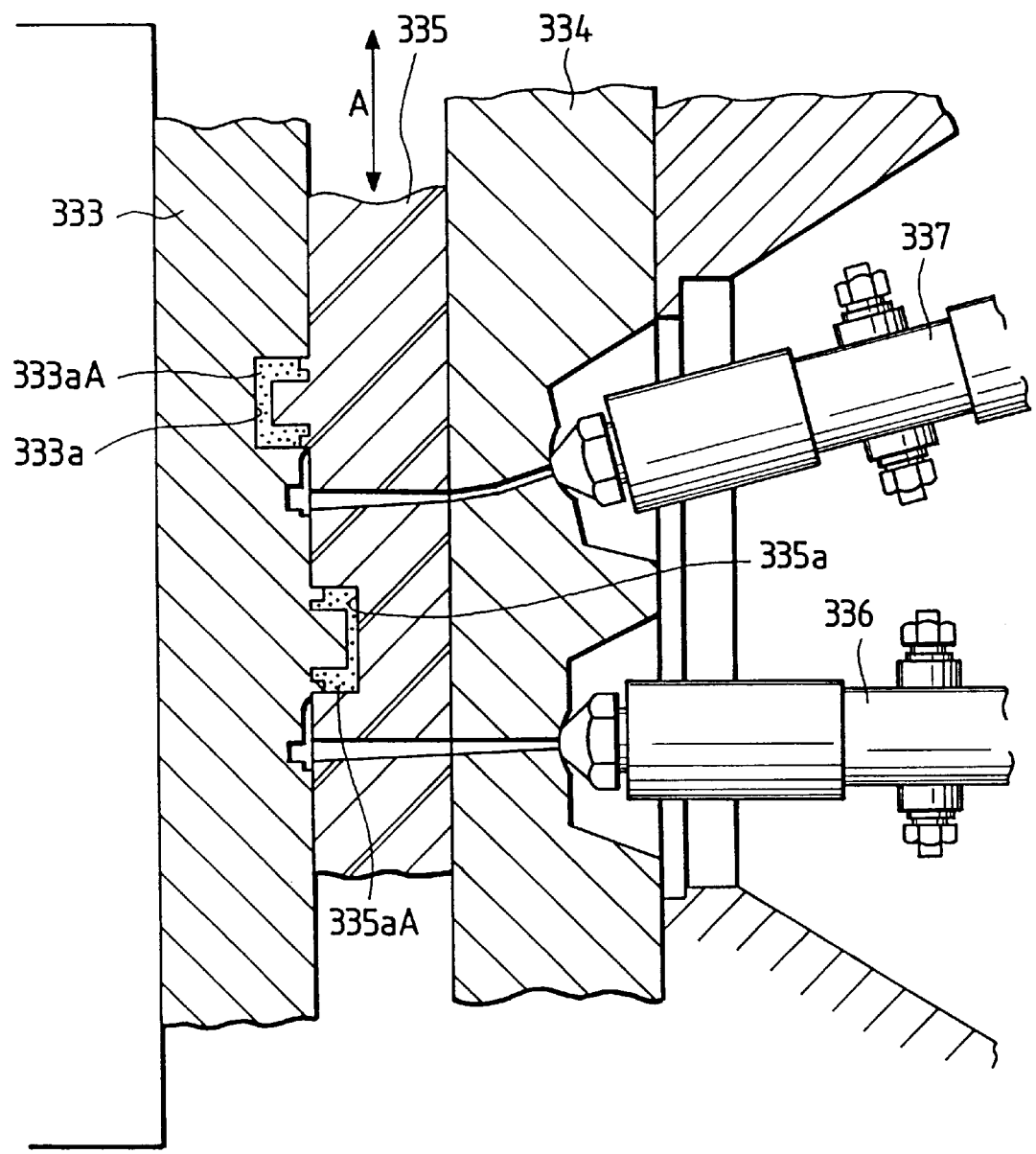
FIG. 12 shows the essential part of FIG. 11 enlarged and in details.

FIG. 10 is a flowsheet of the method of shaping a hollow part in accordance with the invention; FIG. 11 is a schematic diagram of a hollow part injection molding machine; FIG. 12 is a diagram showing the essential part of FIG. 11 enlarged and in details; and FIG. 13 is a schematic drawing of the hollow part produced.

To begin with, a hollow injection molding machine that is to be used in the practice of the invention is described below briefly with reference to FIGS. 11 and 12. The molding machine generally indicated by 330 in FIG. 11 is described in detail in the conventional art and need not be explained here fully. It consists basically of a main body 331, tie-bars 332, a movable mold 333 adapted to be capable of reciprocal movement along the tie-bars 332, a fixed mold 334, and a sliding mold 335 mounted slidably between the movable mold 333 and the fixed mold 334.

The fixed mold 334 is connected to a first injection cylinder 336 and a second injection cylinder 337. Sprues, gates, runners, etc. (not shown) are formed in such a way that feeds of different colors or materials as injected from the cylinders 336 and 337 can be supplied independently into a first cavity 335a in the sliding mold 335 and a second cavity 333a in the movable mold 333, respectively. The sliding mold 335 is adapted to reciprocate in the directions of arrow A as guided by a sliding cylinder (not shown).

The process of shaping a hollow part (indicated by 303a in FIG. 13) with the die sliding type injection molding machine 330 will proceed as follows. First, as shown in FIG. 10, primary shaping 320 is effected; this process starts with first mold closing 301A. Then, feeds of different colors or materials are injected from cylinders 336 and 337 and subsequent dwelling is done; injection from cylinder 336 and subsequent dwelling is designated by 301B whereas injection from cylinder 337 and subsequent dwelling is designated by 302B. The process goes through first cooling/plasticizing 301C and second cooling/plasticizing 302C, followed by first mold opening 301D to complete the process of primary shaping, whereupon the first half 333aA of the part to be finally shaped and the second half 335aA are shaped in the cavities 333a and 335a, respectively.

Secondary shaping 321 then takes over. The sliding mold 335 is slid. In this die sliding (DS) step 322, an insert 323 such as a rubber stopper is fitted into a groove 300 that is defined by a first recess 333aB in the first half of the shaped part 333aA and a second recess 335aB in the inner surface of the second half of the shaped part 335aA and which is slightly thinner than the insert 323. For fitting the insert into the groove 300, an automatic inserting means (not shown) is employed. Since the insert 323 to be fitted in has a slightly greater thickness than the thickness T of the groove 300, one can achieve positive placement of the insert 323 within the groove 300 by insuring that it is pressed into the groove 300 during one step of the shaping process while it is compressed to a smaller volume than it was initially.

Following second mold closing 310, the second injection cylinder 337 (which may be replaced by the first injection cylinder 336) is used to have an annular or otherwise shaped binder resin 340 injected into a groove 341 between the two shaped halves 333aA and 335aA, thereby yielding a hollow part 303a in integral form. The two shaped halves 333aA and 335aA of the hollow part 303a have different colors or are made from different materials and this gives a clue by which one can identify the chemical or other contents of the hollow part. It should be mentioned here that the color or the material of the binder resin 340 should be the same as those of either one of the shaped halves 333aA and 335aA. Needless to say, the two shaped halves 333aA and 335aA may be designed to have the same color or to be made from the same material if this is desirable. Therefore, according to the present invention, one can produce either of the following three types of hollow part 303a: a type having the insert 323 incorporated therein; a type in which the two shaped halves 333aA and 335aA have different colors or are made from different materials and in which the binder resin 340 has the same color or is made from the same material as either one of those shaped halves; and a type in which the two shaped halves 333aA and 335aA have different colors or are made form different materials without using a binder resin.

Third Embodiment

In the following examples, a desired hollow part is produced from a synthetic resin by primary and secondary shaping processes. In the primary shaping process, two split halves of the final hollow part are shaped in separate molds and at least one mold is moved or slid to the other mold so that the joining portions, or open ends, of the shaped split halves are brought into abutment against each other. In the secondary shaping process, the joining portions of the split halves are fused on the periphery by means of a molten resin to yield the desired hollow part.

Figure 15:
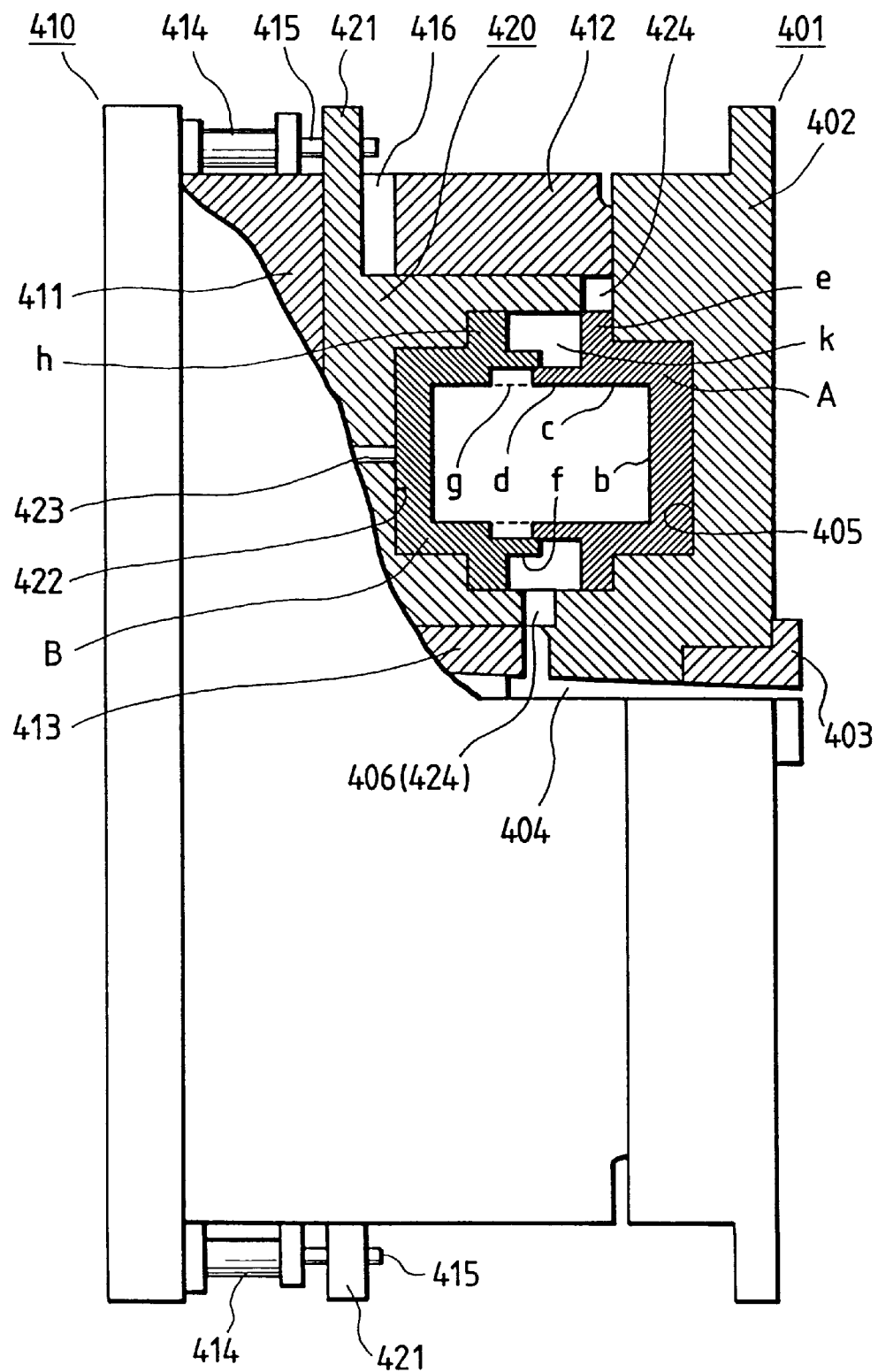
FIG. 15 is front view showing in partial section the first example of the shaping mold for use in the invention.

The primary shaping process for preparing a pair of split halves and the mold to be used in the conventional art are described above. The conventional art described above can be applied to perform primary shaping. Namely, the combination of a fixed mold, a sliding mold capable of relative movement to the fixed mold, and a movable mold which is to be brought into registry with the sliding mold is used to shape a pair of split halves and the sliding mold is moved toward the movable mold so that the joining portions, or open ends, of the two spilt halves are brought into abutment against each other. If desired, two split halves may be shaped in two molds making a pair and both molds are moved or rotated so that the joining portions of the split halves are brought into abutment against each other. FIG. 15 shows the end of primary shaping, with a pair of molds having been moved so that the joining portions of a first and a second split half A and B are brought into abutment against each other.

The molding machine for use in the third example of the invention is shown in FIG. 15 as generally indicated by 401 and it consists basically of a moving die 402, a movable frame 410 which is driven in two directions, one approaching the moving die 402 and other departing from it, and a cavity plate 420 provided between the moving die 402 and the movable frame 410 in such a way that it is capable of movement in an axial direction. The cavity plate 420 may be driven as required.

The moving die 402 is adapted to move in such a way that it takes two positions alternately, one being the first position which, although not shown, permits either sliding with respect to a fixed die or frame or primary shaping as taught in the conventional art, and the other being the second position shown in FIG. 15 which permits secondary shaping. The following description is directed to the molding machine 401 as it has finished the necessary movement in preparation for secondary shaping.

The moving die 402 has a locating ring 403 fitted in the generally central portion. The hole in the locating ring 403 communicates with a sprue 404 formed in the moving die 402 and the sprue 404 in turn communicates via a gate 406 with a plurality of cavities or recesses 405 and 422 arranged symmetrically in the die 402.

One of the two registering faces of the moving die 402 has the recess 405 formed in it for shaping the outer side faces of the first split half A. In the example under consideration, the first split half A is generally in a box shape and consists of a bottom portion b and a peripheral portion c that rises from the four sides of the bottom portion b. The peripheral portion c is thin-walled in the open end portion or distal end portion d, with an annular projection e being formed as an integral part of the skirt in the neighborhood of the distal end portion. Compared to the first split half A which has a fairly complex shape, the moving die 402 is simple in construction with the presence of the recess 405. Therefore, if the mating die (e.g., moving die 402) for shaping the inner peripheral surface and the distal end portions of the first split half A is of a sliding type, the cavity plate 420 has a geometry that corresponds to the distal end portion d, projection e and other parts of the first split half A.

The movable frame 410 has a movable member 411 as an integral part; a tubular guide 412 for guiding the cavity plate 420 is provided in the outer peripheral portion of the member 411 and a guide bar 413 is provided in its central portion. A plurality of piston-cylinder units 414 are provided in the outer peripheral portion of the movable frame 410 and the piston rod 415 of each unit 414 is coupled to the cavity plate 420. With this construction, extending or contracting the piston rods 415 causes the cavity plate 420 to move in an axial direction with respect to the movable member 411. To allow for this movement, a play 416 is provided for the guide 412. The movable frame 410 is capable of approaching or departing from the moving die 402 in order to effect mold clamping or opening, respectively.

The cavity plate 420 is generally in a tubular form. Its outer circumference is in contact with the inner circumference of the guide 412 of the movable member 411 so that the plate 420 is guided for its axial movement. A hole of a predetermined depth is formed in the central portion of the cavity plate 420 and the guide 413 is inserted into this hole. The cavity plate 420 is generally a tubular or disk shape, with brackets 421 formed in areas on the outer circumference close to the movable frame 410. The brackets 421 extend radially outward through the play 416 for the guide 412. The piston rods 415 in the piston-cylinder units 414 are coupled to these brackets 421.

One surface of the cavity plate 420 will be pushed during mold clamping together with the movable member 411 whereas the other surface of the plate which serves as the registering face has the recess 422 formed therein for shaping the outer peripheral surface of the second split half B. Being the pair to the first split half A, the second split half B is generally of the same geometry as the first split half A except in the joining end portion. Thus, explanation is necessary only for the joining portion at the distal end of the second split half B. The distal end portion f of B has an annular cutout g in the inner surface and is small in wall thickness. As if making a pair with the cutout g, an annular projection h is formed as an integral part of the outer periphery. To make the second split half B of this shape, the mating male die has naturally a geometry that corresponds to the distal end portion f, cutout g, projection h, etc. Shown by 423 in FIG. 15 is a push or ejector pin which penetrates the cavity plate 420 in an axial direction.

We now describe the process of secondary shaping in which the joining portions of the first and second split halves A and B, namely, the distal end portions d and f, as well as projections e and h, are fused on the periphery by means of a molten resin using the molding machine 401.

Suppose that the first and second split halves A and B have already been shaped by a suitable method of primary shaping that is selected from among the applicable methods described above. Then, with the first and second split halves A and B being fitted in the moving die 402 and the cavity plate 420, respectively, the die 402 or movable frame 410 is moved until the distal end portion d of the first split half A overlaps slightly with the distal end portion f of the second split half B. Thereafter, the movable frame 410 is driven toward the die 402 to effect mold clamping using a clamp unit not shown. Upon completion of mold clamping, the mold registering face of the guide 412 of the movable member 411 will contact the mold registering face of the die 402.

The cavity plate 420 is also pushed by the movable member 411 to move during mold clamping, provided that gaps 424 will be left between the front end portion of the cavity plate 420 and the mold registering face of the moving die 402. When the mold clamping operation ends, the molding machine assumes the state shown in FIG. 15. It should be noted here that the timing of bringing the distal end portion d of the first split half A into abutment against the distal end portion f of the second split half B may be simultaneous with mold clamping.

Figure 16:
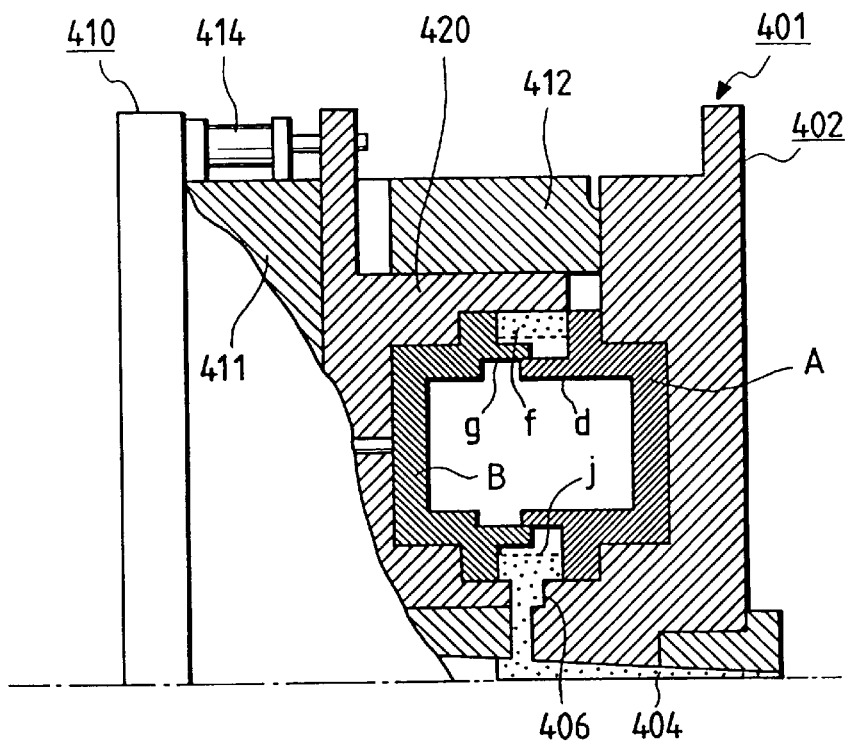
FIG. 16 is a front view showing in partial section the first stage of the process for fusing a pair of split halves of the final hollow part using the shaping mold shown in FIG. 15.

In the next step, a shot of molten resin j is injected from the injection cylinder to pass through the locating ring 403, sprue 404, gate 406, etc. at a comparatively low pressure. The molten resin j is injected primarily into the annular space k defined by the annular projections e and h on the first and second split halves A and B, as well as by the inner circumference of the cavity plate 420. When the injection of the resin has ended, the molding machine assumes the state shown in FIG. 16.

Figure 17:
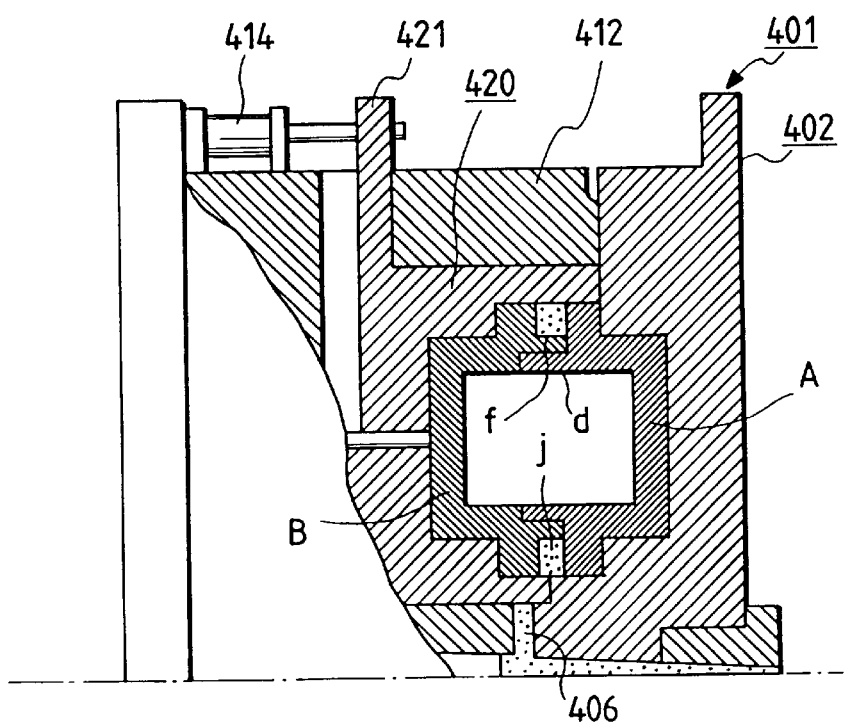
FIG. 17 is a front view showing in partial section the second stage of the process for fusing a pair of split halves of the final hollow part using the shaping mold shown in FIG. 15.

The injection of the molten resin j is ceased and before it cools to solidify, a working fluid such as hydraulic oil is supplied to the piston-cylinder units 414 to drive the piston rods 415. Then, the cavity plate 420 coupled to the piston rods 415 is driven forward until its front end portion contacts the registering face of the moving die 402. With the cavity plate 420 being thusly driven, the second split half B is also driven toward the first split half A. As a result, the distal end portion d of the first split half A contacts the end face of the cutout g in the second split half B whereas the end face of the distal end portion f of the second split half B contacts the projection e on the first split half A. With the cavity plate 420 being thusly driven, the space k defined by the annular projections e and h on the first and second split halves A and B, as well as by the inner circumference of the recess 422 in the cavity plate 420 is narrowed, whereby the injected molten resin j will be compressed. As a result, the first and second split halves A and B are fused in the peripheral portion of the joint as shown in FIG. 17.

Figure 18:
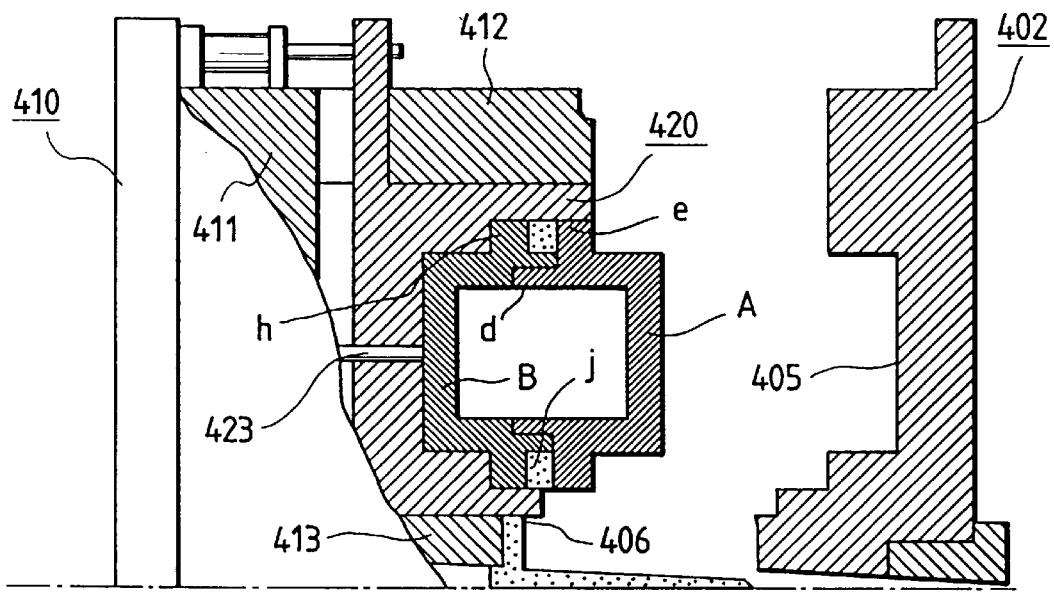
FIG. 18 is a front view showing in partial section the mold opening stage following the fusion of a pair of split halves of the final part using the shaping mold shown in FIG. 15.

In the next step, the movable frame 410 is driven to the left of FIG. 18 to effect mold opening. As the same time, the cavity plate 420 is retracted together with the frame 410. When it is retracted in a predetermined amount, the ejector pin 423 pushes the shaped hollow part S out of the mold.

Figure 19:
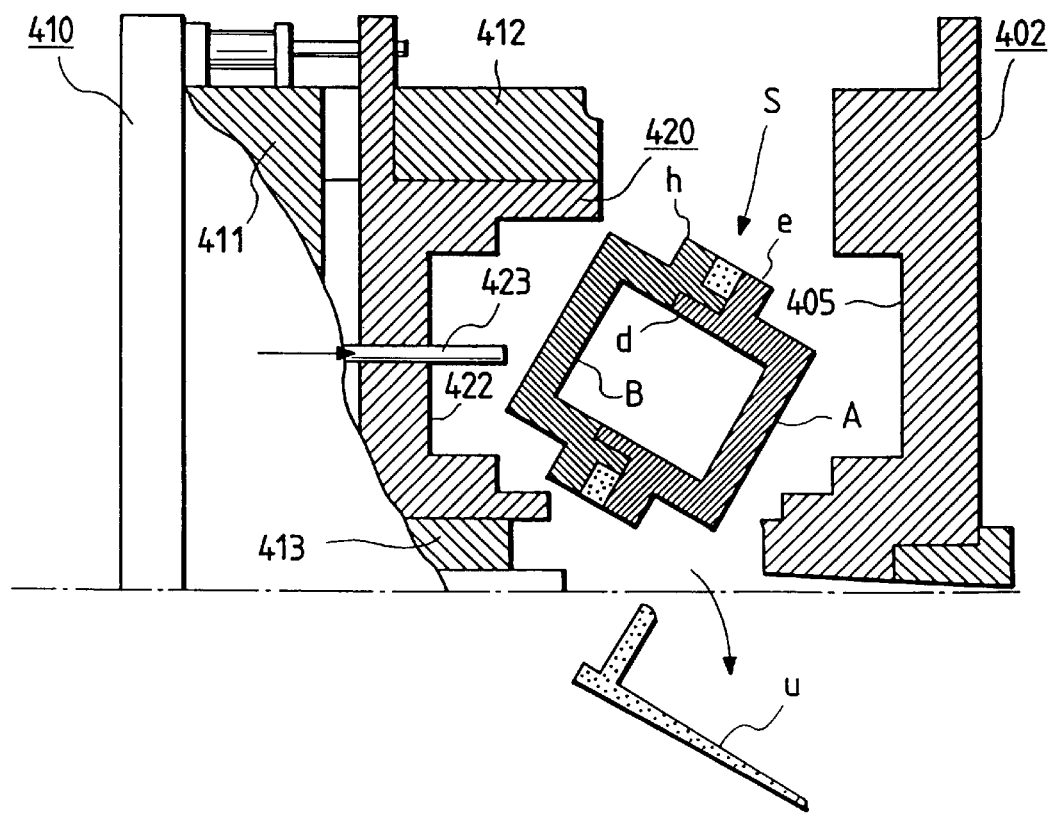
FIG. 19 is a front view showing in partial section the recovery of the final hollow part as produced by using the shaping mold shown in FIG. 15.

According to the first example described above, the molten resin is injected into the comparatively wide space k defined by the annular projections e and h on the first and second split halves A and B, as well as by the inner circumference of the recess 422 in the cavity plate 420 and this permits the use of a lower injection pressure. Hence, there is no possibility that the first and second split halves A and B, which are the products of primary shaping, are deformed under high injection pressure. The low injection pressure also eliminates the chance of the molten resin of leaking into the first or second split half A or B. It should particularly be noted that in the first embodiment under consideration, resin injection is performed with the distal end portion d of the first split half A partly overlapping the distal end portion f of the second split half B; this fact, combined with the low injection pressure, eliminates the possibility of internal leakage of the resin, which is in sharp contrast with the case of injecting the resin with these portions merely held in abutment against each other. A further advantage is that part of the cavity plate 420, as it is driven by the piston rods 415, traverses the gate 406 (see FIG. 19); in other words, gate cutting can be accomplished within the mold and the sprue resin u will fall automatically. This offers the added advantage of improving the efficiency of recovering the hollow part S.

In the third embodiment described above, the cavity plate 420 is mounted in association with the movable member 411; however, it will be obvious to one skilled in the art that the invention can be implemented effectively even if the cavity plate 420 is mounted in association with the moving die 402 although a somewhat complex structure is necessary. It will also be obvious to one skilled in the art that the geometry of the space defined by the annular projections e and h on the first and second split halves A and B is by no means limited to the illustrated case. In other words, the invention can be practiced with the space of any geometry as long as its capacity will decrease with the driving of the cavity plate 420.

Fourth Embodiment

A fourth embodiment of the present invention is described below with reference to FIGS. 20 to 24, in which the members, essentially the same as those used in the third embodiment illustrated in FIGS. 15 to 19, are identified by like numerals and will not be described again.

Figure 20:
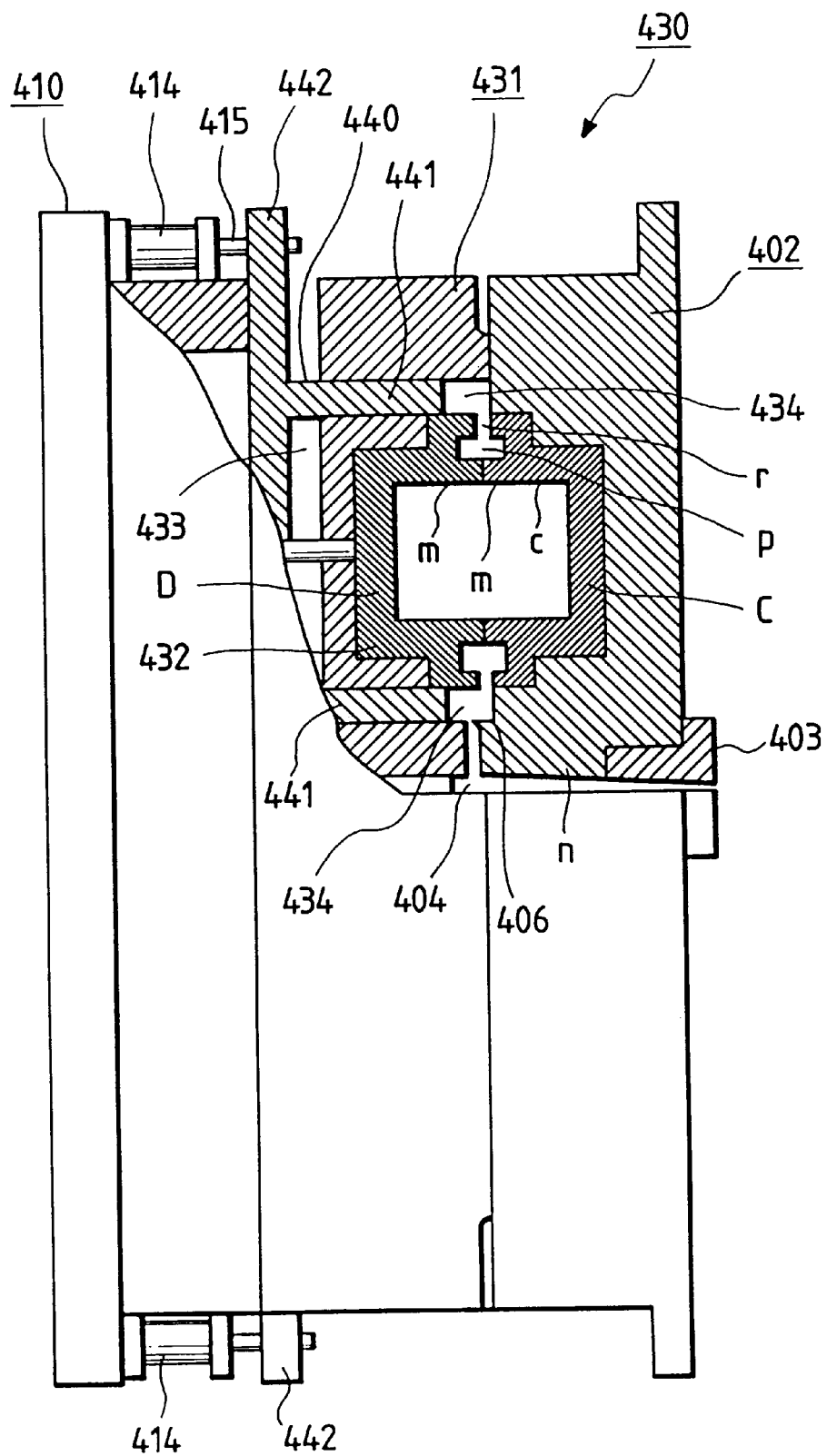
FIG. 20 is a front view showing in partial section the second example of the shaping mold for use in the invention.
Figure 21:
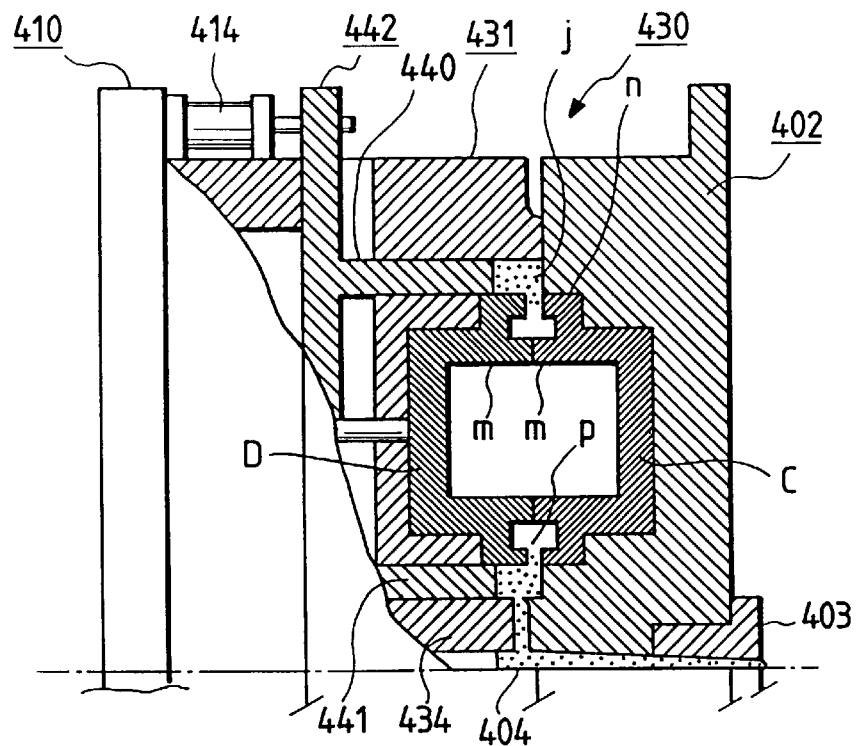
FIG. 21 is a front view showing in partial section the first stage of the process for fusing a pair of split halves of the final hollow part using the shaping mold shown in FIG. 20.
Figure 22:
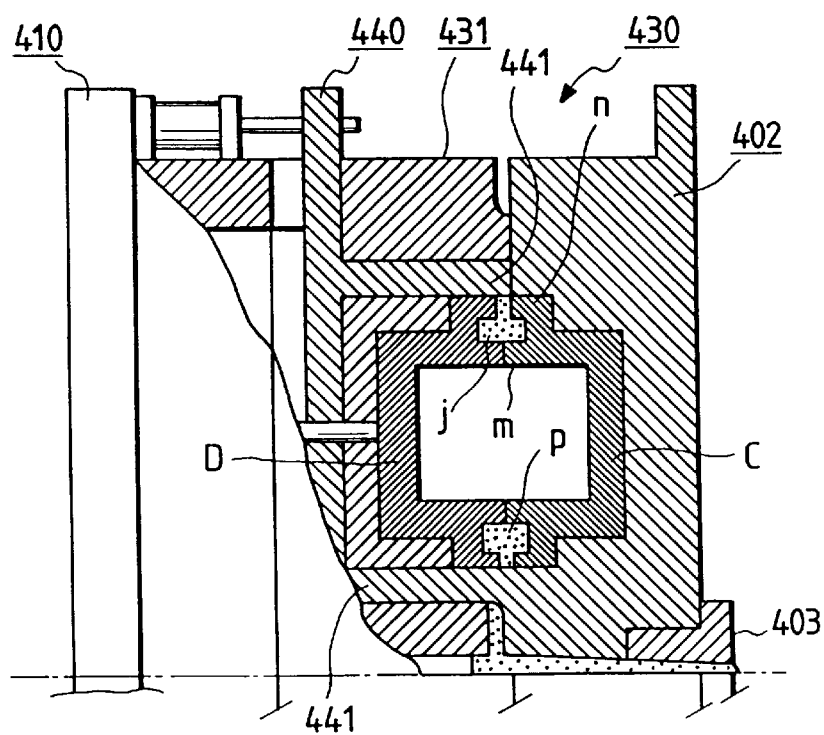
FIG. 22 is a front view showing in partial section the second stage of the process for fusing a pair of split halves of the final hollow part using the shaping mold shown in FIG. 20.

FIG. 20 is similar to FIG. 15 in that it shows the end of primary shaping, with a pair of molds having been moved in such a way that the joining portions of a first and a second split half C and D are brought into abutment against each other.

The molding machine for use in the second example is shown in FIG. 20 as generally indicated by 430 and it consists basically of a moving die 402, a movable die 431 which is driven in two directions, one approaching the moving die 402 and the other departing from it, and a compressing member 440 provided within the movable die 431 in such a way that it is capable of movement in an axial direction. The compressing member 440 may be driven as required.

One of the two mold registering faces of the moving die 402 has a recess 405 formed as in the third embodiment for the purpose of shaping the outer peripheral surface of the first split half C. The joining portion, or the open end, of the first split half C is bifurcated and consists of a distal end portion m that extends straight from the peripheral portion c and a hooked projecting portion n that branches outward at the base of the distal end portion m. The distal end portion m is longer than the hooked projecting portion n. Because of this feature, not only is a fusion space p formed between the outer peripheral surface of the distal end portion m and the inner peripheral surface of the projecting portion n but also a gate r is formed between the projecting portions n of the first and second split halves C and D when the distal end portion of the first split half C is brought into abutment against the distal end portion of the second split half D. Needless to say, the mating die for shaping the first split half C has a corresponding geometry.

The movable frame 410 has the movable die 431 as an integral part. The mold registering face of the movable die 431 has a recess 432 formed in it for shaping the outer peripheral surface of the second split half D. The second split half D is the pair to the first split half C and it has generally the same geometry as the latter. Therefore, the second split half D is referenced by the same numerals and will not be described below in detail. Suppose here that the first and second split halves C and D are brought into abutment against each other in preparation for secondary shaping. Since the joining portion, or the open end, of each split half is bifurcate, the fusion space p is formed in this bifurcate portion. As already mentioned, the hooked projecting portion n is shorter than the distal end portion m; therefore, when the two split halves are brought into abutment against each other, the annular continuous gate r will form between the hooked projecting portion n on the abutting faces. If desired, the projecting portions n may be designed to project in varying amounts so as to form a discontinuous gate r.

The movable die 431 has an annular runner portion 434 formed over a predetermined width in an axial direction. As clear from FIG. 20, the inside diameter of the runner portion 434 is adjusted to be equal to the outside diameter of the hooked projecting portion n of the second split half D. Hence, the runner portion 434 communicates with the gate r. The movable frame 410 is provided with a plurality of piston-cylinder units 414 in the outer peripheral portion and the piston rods 415 in the units 414 are coupled to a compressing member 440 which will be described just below. With this construction, extending or contracting the piston rods 415 causes the compressing member 440 to move in an axial direction. To allow for this movement, a play 433 is provided for the movable die 31 so that the brackets 442 of the compressing member 440 can be moved. The movable frame 410 is capable of approaching or departing from the moving die 402 in order to effect mold closing or opening, respectively.

The compressing member 440 has a plunger portion 441 of a given wall thickness. This plunger portion 441 is inserted into the runner portion 434 of the movable die 431 and works as a piston. The compressing member 440 has the brackets 442 formed in areas of its outer peripheral portion. The brackets 442 extend radially outward through the play 433 for the movable die 431. The piston rods 15 in the piston-cylinder units 414 are coupled to these brackets 442.

We now describe the process of secondary shaping in which the circumferential portions, such as the distal end portions m and the hooked projecting portions n, of the first and second split halves C and D are fused with a molten resin using the molding machine 430.

Suppose that the first and second split halves C and D have already been shaped by a suitable method of primary shaping that is selected from among the applicable methods described hereinabove. Then, with the first and second split halves C and D being fitted in the moving die 402 and the movable die 431, respectively, the die 402 is moved until the distal end portions m of the respective split halves abut against each other. Thereafter, the movable frame 410 is driven toward the die 402 to effect mold clamping using a clamp unit not shown. Upon completion of mold clamping, the mold registering face of the die 431 will contact the registering face of the die 402, as shown in FIG. 20.

In the next step, a shot of molten resin j is injected from the injection cylinder to pass through the locating ring 403, sprue 404, gate 406, etc. at a comparatively low pressure. Because of low injection pressure, the fusion space p defined between the hooked projecting portions n of the first and second split halves C and D resists the injection of the resin, which is therefore injected primarily into the runner portion 434. When the low-pressure injection of the resin has ended, the molding machine assumes the state shown in FIG. 21.

The injection of the molten resin j is ceased and before it cools to solidify, a working fluid such as hydraulic oil is supplied to the piston-cylinder units 414 to drive the piston rods 415. Then, the compressing member 440 coupled to the piston rods 415 is driven forward through the runner portion 434 until the front end of the plunger portion 441 contacts the registering face of the die 402. With the compressing member 440 being thusly driven, the space in the runner portion 434 is narrowed to eventually become zero. Therefore, the molten resin j injected into the runner portion 434 is pushed through the gate r to fill the fusion space p defined between the distal end portions m and projecting portions n of the first and second split halves C and D. As a result, the two split halves are fused together in the joint (see FIG. 22).

Figure 23:
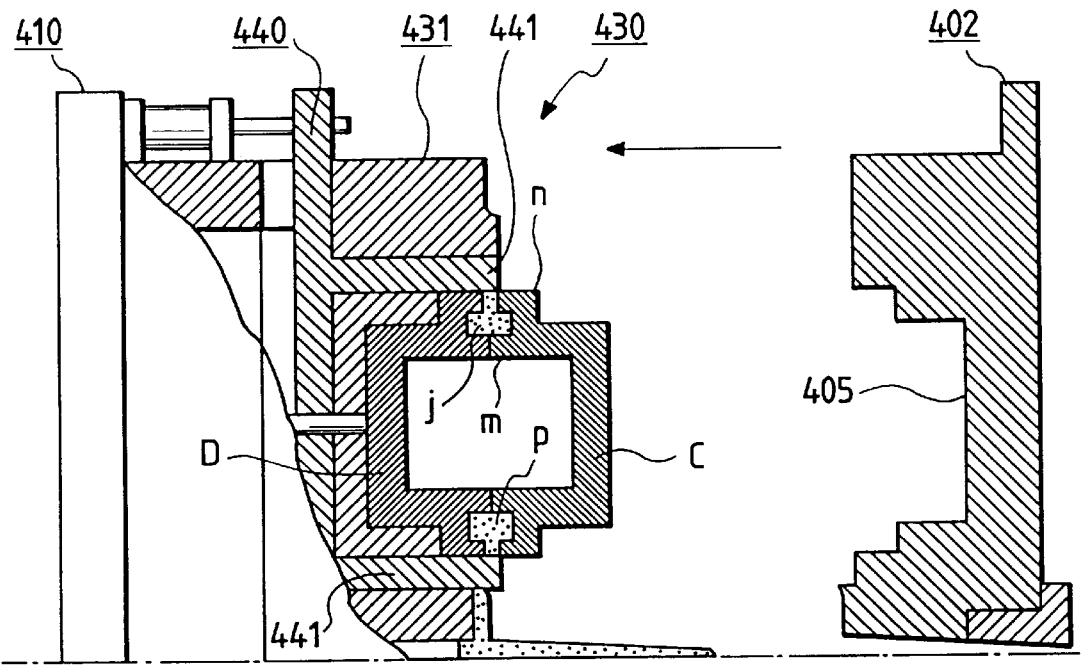
FIG. 23 is a front view showing in partial section the mold opening stage following the fusion of a pair of split halves of the final hollow part using the shaping mold shown in FIG. 20.
Figure 24:
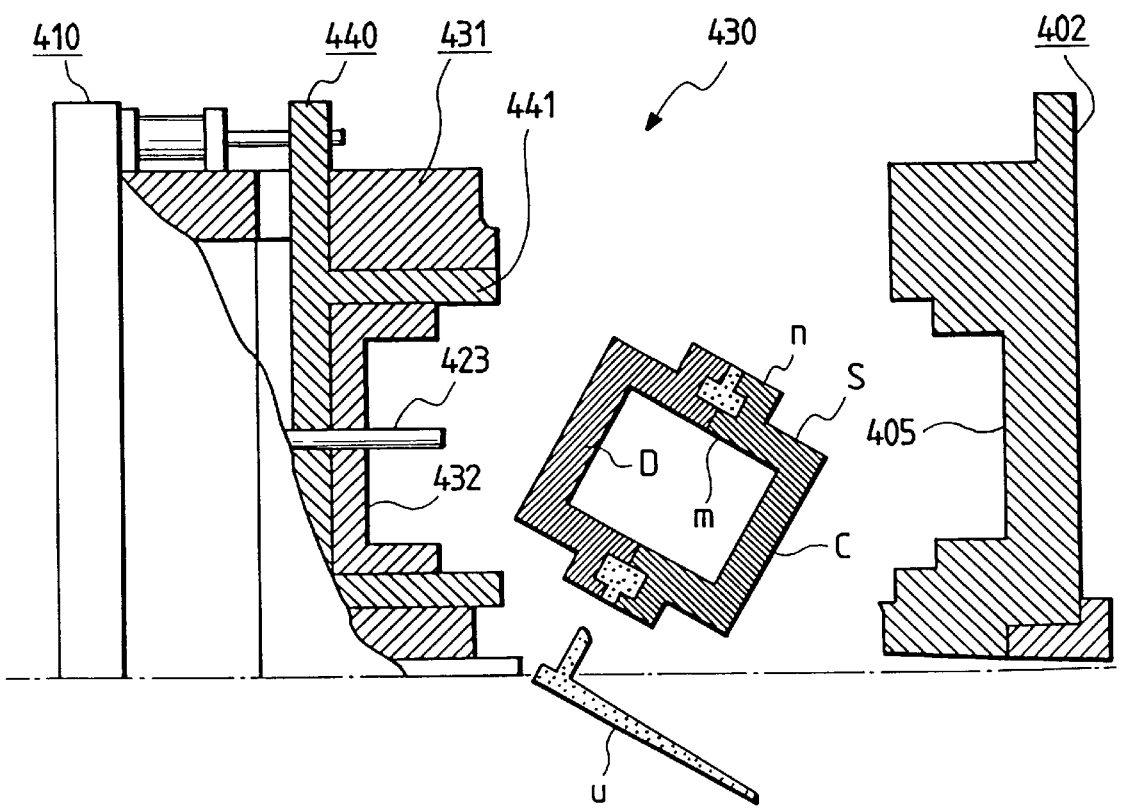
FIG. 24 is a front view showing in partial section the recovery of the final hollow part as produced by using the shaping mold shown in FIG. 20.

When the resin cools to solidify, the movable frame 10 is driven as shown in FIG. 23 to effect mold opening. At the same time, the compressing member 440 is retracted together with the frame 410. When it is retracted in a predetermined amount, the ejector pin 423 pushes the shaped hollow part S out of the mold.

As in the first example, the molten resin can be injected at low pressure in the second example since it is injected into the comparatively wide runner portion 442. Hence, there is no possibility that the first and second split halves C and D, which are the products of primary shaping, are deformed under high injection pressure. The low injection pressure also eliminates the chance of the molten resin of leaking into the first or second split half C or D. A further advantage is that the plunger portion 441 of the compressing member 440, as it is driven by the piston rods 415, traverses not only the gate 406 but also the outer peripheral surfaces of the hooked projecting portions n (see FIG. 24); in other words, gate cutting can be accomplished within the mold and the sprue resin u will fall automatically. This offers the added advantage of improving the efficiency of recovering the hollow part S and, at the same time, it is free from residual burrs.

FIGS. 20 to 24 show the case of mounting the compressing member 440 on the movable die 431; however, it will be obvious to one skilled in the art that the invention can be implemented even if the compressing member 440 is mounted in association with the moving die 402. It will also be obvious to one skilled in the art that the geometries of the distal end portions m and projecting portions n of the first and second split halves C and D are by no means limited to the illustrated case.

Fifth to seventh embodiments of the invention are described below with reference to FIGS. 25 to 37, in which the components that are identical or equivalent to those used in the conventional techniques which are shown in FIGS. 25 to 32 are identified by like numerals for the sake of convenience in explanation.

Fifth Embodiment

Figure 25:
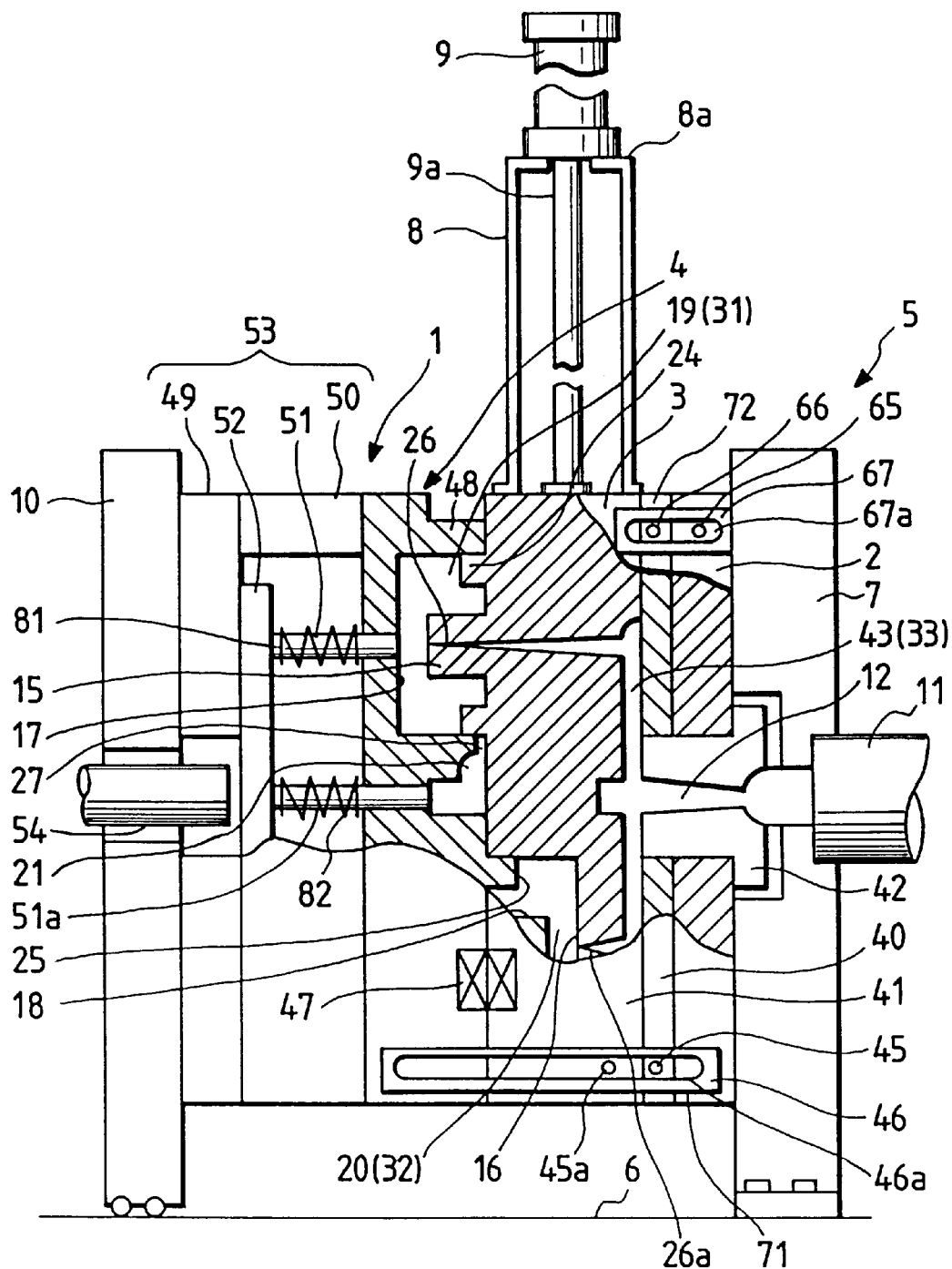
FIG. 25 is a longitudinal sectional view showing the mold assembly used to shape a hollow part in a fifth embodiment of the present invention.

FIG. 25 is a longitudinal sectional view showing an example of the mold assembly of the invention for shaping hollow parts. FIGS. 26 to 33 are longitudinal sectional views illustrating the method of shaping a hollow part with the mold assembly by showing its state in each step of the method.

As is clear from FIG. 25, the mold assembly generally indicated by 1 is composed of a fixed mold 2, a runner plate 40, a sliding mold 3, a sliding mold guide 41 and a movable mold 4. The fixed mold 2 is secured to a fixed platen 7 which is integral with the bed 6 of an injection molding machine 5. A support 8 having a horizontal arm 8a is erected on top of the sliding mold guide 41. The top of the horizontal arm 8a is furnished with a hydraulically, pneumatically or otherwise operated sliding cylinder 9. The cylinder may be replaced by an electric motor. The cylinder 9 has a piston rod 9a connected to the top of the sliding mold 3. Thus, the sliding mold 3 is capable of sliding vertically between the lower position where the cylinder 9 is extended fully within the sliding mold guide 41 and the higher position where it is contracted fully.

The movable mold 4 is mounted on a movable platen 10 which is supported on the bed 6 of the injection molding machine 5 in a horizontally movable manner. The movable platen is adapted to be moved back and forth with respect to the fixed platen 7 by means of a mold clamping unit not shown. Thus, the movable mold 4 is adapted to be moved back and forth between the mold registering position where the sliding mold, the runner plate 40 (to be described later) and the fixed mold 2 are held in intimate contact with one another and the mold opening position where those members are separated from one another.

The fixed mold 2 is furnished in its center with a sprue bush 42 that has a sprue 12 for guiding a molten resin injected from an injection unit 11. Provided between the fixed mold 2 and the sliding mold 3 is the runner plate 40 that is slidably fitted over the sprue bush 42.

Figure 30:
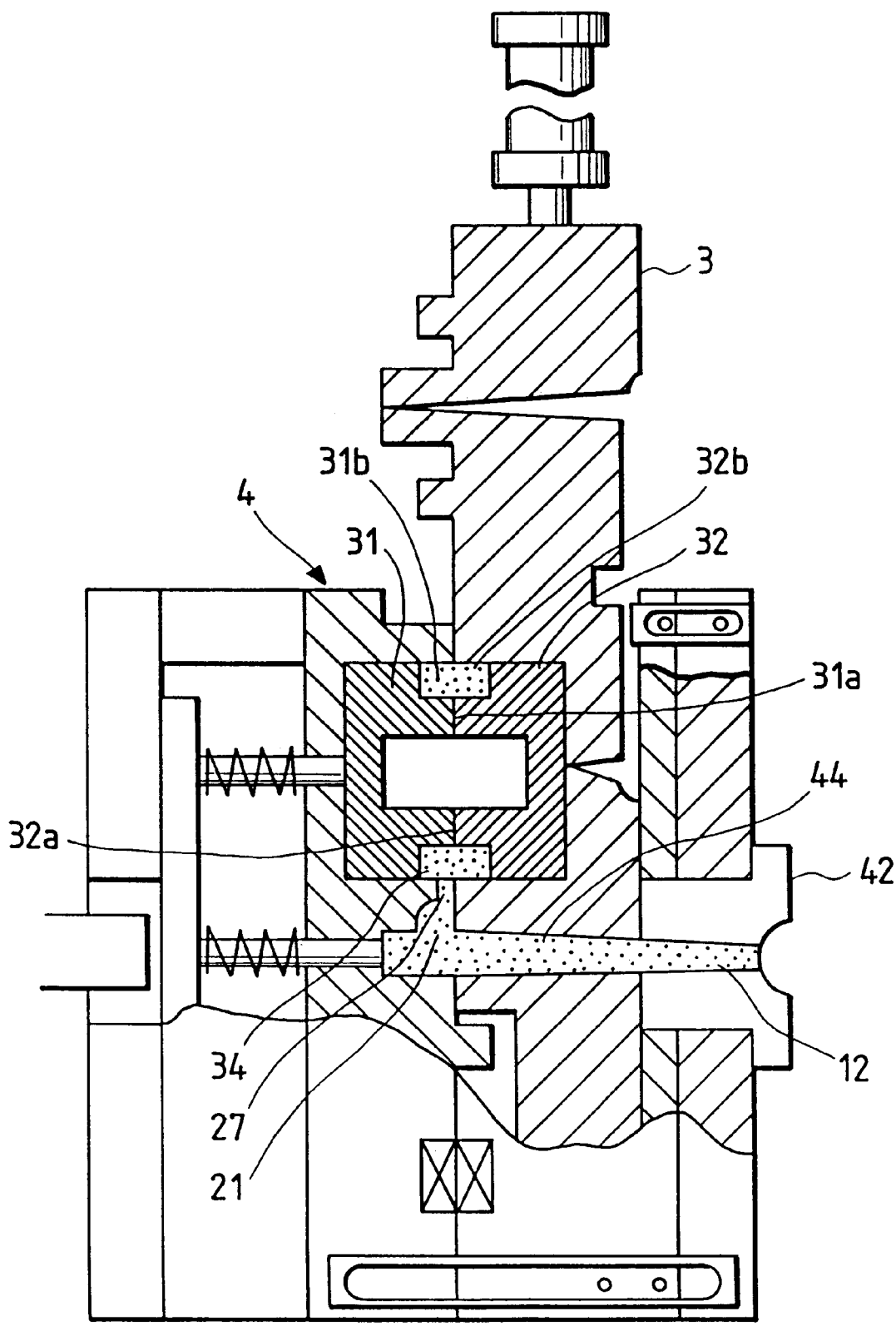
FIG. 30 is a longitudinal sectional view showing a subsequent step in the process of the fifth embodiment.
Figure 31:
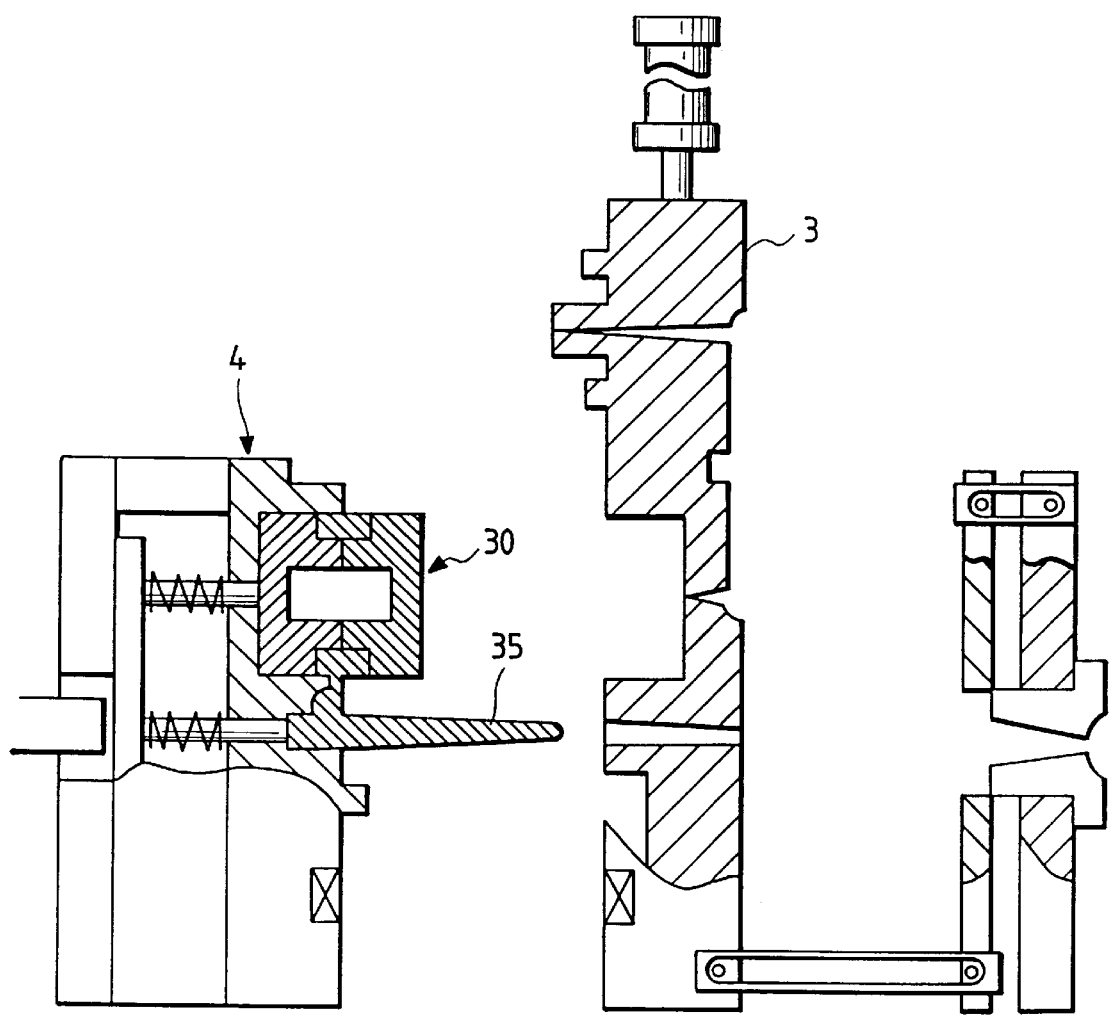
FIG. 31 is a longitudinal sectional view showing a subsequent step in the process of the fifth embodiment.

The sliding mold 3 in turn is furnished with a primary sprue 43 that is continuous to the sprue 12 when the mold 3 is located in the lower position (see FIG. 26), as well as with a lower secondary sprue 44 that is continuous to the sprue 12 when the mold 3 shifts to the upper position (see FIG. 30).

The sliding mold 3 has a male die 15 and a female die 16 provided at the mold registering face. The male die 15 will shape the inner surface of one of the split halves of the hollow part to be made, and the female die 16 will shape the outer surface of the other split half. The mold registering face of the movable mold 4 is provided with a female die 17 and a male die 18 that will face the male die 15 and the female die 16, respectively, when the sliding mold 3 is located in the lower position. The female die 17 will shape the outer surface of one split half whereas the male die 18 will shape the inner surface of the other split half. The female die 17 in the movable mold 4 is adapted to face the female die 16 in the sliding mold 3 when it is located in the upper position.

Thus, when the sliding mold 3 is located in the lower position and the movable mold 4 brought into registry with it, a pair of cavities 19 and 20 are formed between the sliding mold 3 and the movable mold 4, the cavity 19 being defined by the male die 15 and the female die 17 and the cavity 20 by the male die 18 and the female die 16. In this case, the primary sprue 43, as well as gates 26 (or 26a) in the sliding mold 3 communicate with the central portion of the female die 17 (or 16), namely, the cavity 19 (or 20). On the other hand, when the sliding mold 3 is located in the upper position and the movable mold 4 brought into registry with it, the female dies 16 and 17 in the sliding mold 3 and the movable mold 4, respectively, are brought into abutment against each other so that the lower secondary sprue 44 will communicate with the end edge portions of these female die 16 and 17 via a runner 21 and gate 27 in the movable mold 4.

The peripheral edge portions of the male dies 15 and 18 are furnished with small projections 24 and 25 that are to be fitted in the peripheral edge portions of the female dies 17 and 16, respectively.

The device of the present invention employs fixing means 71 for fixing the sliding mold guide 41, to which the sliding mold 3 is mounted, to the runner plate 40. The fixing means 71 comprises pins 45 and 46 which are respectively provided in the horizontal direction on the runner plate 40 and the sliding mold guide 41 to which the sliding mold 3 are arranged, and a pulling device 46 consutituted of an elengated hole 46a engaged with the pins 45 and 46. Moreover, the device employs auxiliary fixing means 72 for fixing the runner plate 40 to the fixing mold 2. The auxiliary fixing means is constituted of pins 65 and 66 arranged in the horizontal direction on the fixing mold 2 and the runner plate 40, respectiely, and am auxiliary pulling device 67 including an auxiliary elongated hole 67a which is engaged withe pins 65 and 66. The fixing means 71 and 72 is not limited by the structure described above. It is applicable for employing a bolt and nut. The are where the movable mold 4 contacts the sliding mold guide 41 or sliding 3 is furnished with a parts lock 47 that will remain effective until a certain minimum force is applied.

The movable mold 4 comprises a mold portion 48 having the male die 18 and the female die 17 and an ejector box 53. The ejector box 53 comprises a coupling portion 49 coupled to the movable platen 10, an intermediate member 50 for providing a given space between the mold portion 48 and the coupling portion, and an ejector plate 52 that is provided in the given space and which has ejector pins 51 and 51a for knocking out the shaped hollow part 30 and a resin sprue runner portion 35 that is formed as a result of resin solidification within the secondary sprue 44. The ejector plate 52 move backward by springs 81 and 82 arranged around the ejector pins 51 and 51a when an ejecting operation is finished.

Figure 26:
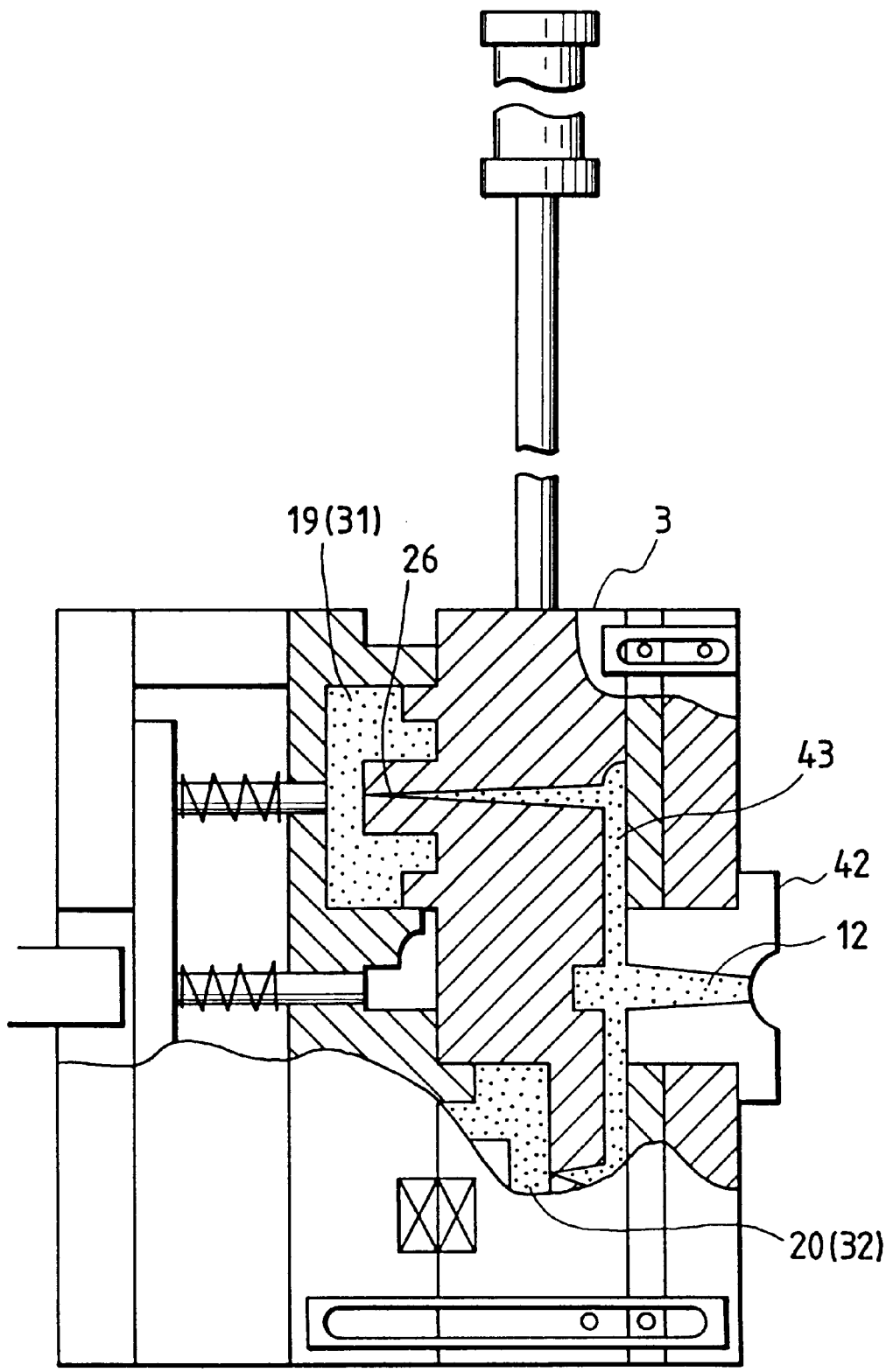
FIG. 26 is a longitudinal sectional view showing a step in the process of shaping a hollow part in the fifth embodiment.

The mold assembly 1 having the construction just described above is operated in the following manner. First, the cylinder 9 is extended to locate the sliding mold 3 in the lower position. Then, the movable platen 10 of the injection molding machine 5 is moved toward the fixed platen 7 so that the movable mold 4 is in registry with the sliding mold 3 and, subsequently, the sliding mold 3, the runner plate 40 and the fixed mold 2 are brought into a unitary assembly. Then, as shown in FIG. 25, the primary sprue 43 in the center of the sliding mold 3 is continuous to the sprue 12 in the sprue bush 42, forming a pair of cavities 19 and 20 between the sliding mold 3 and the movable mold 4. Following the cavity formation, a molten resin is injected from the injection unit 11 connected to the fixed platen 7. The injected resin passes through the sprue 12 in the sprue bush 42 and through the primary sprue 43 in the center of the sliding mold 3 to be guided to both cavities 19 and 20 through gates 26 and 26a, filling those cavities 19 and 20 as shown in FIG. 26. Thus, two split halves 31 and 32 of the desired hollow part are shaped in the cavities 19 and 20, respectively.

Figure 27:
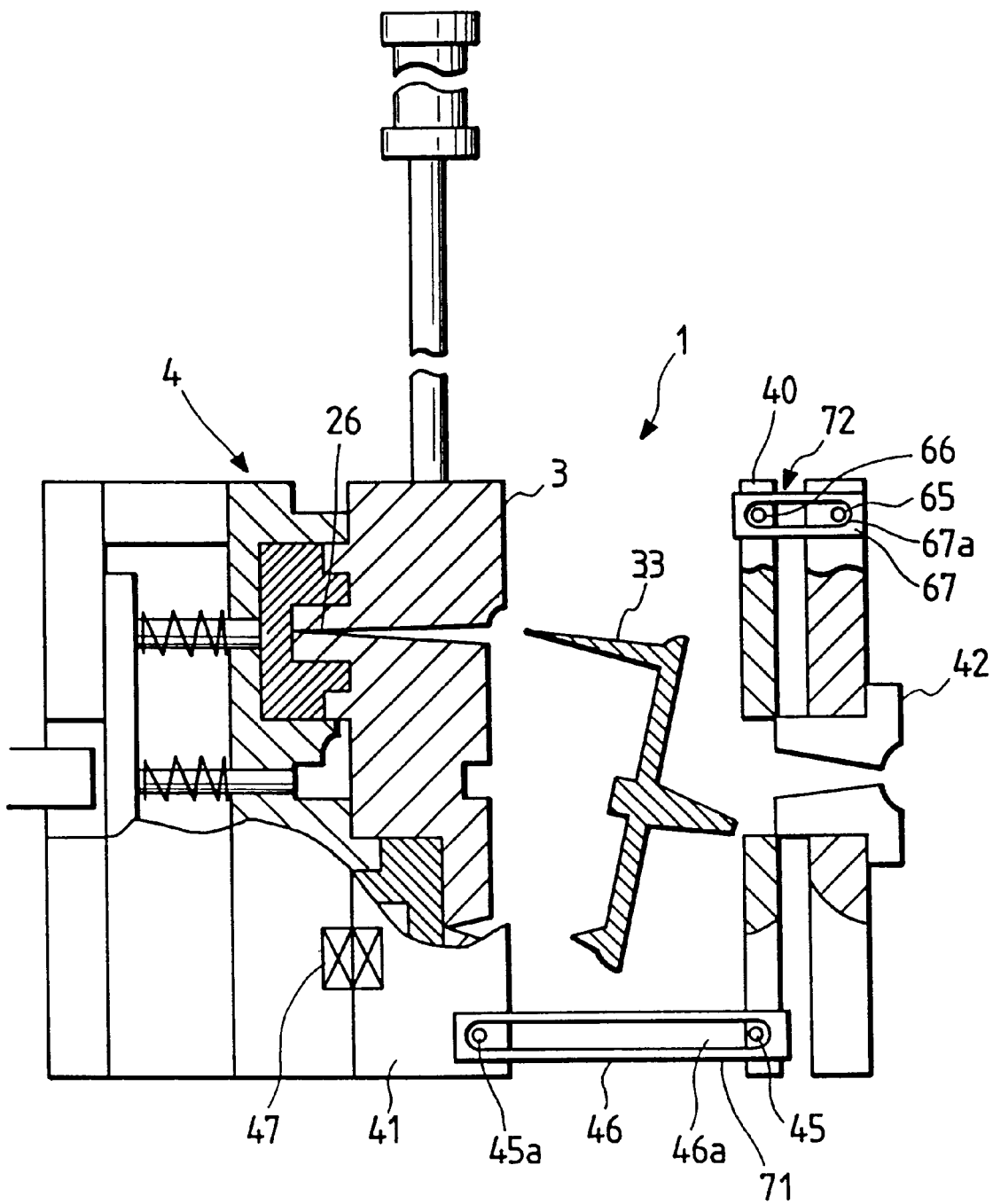
FIG. 27 is a longitudinal sectional view showing a subsequent step in the process of the fifth embodiment.

After the split halves 31 and 32 are cooled to solidify, the mold clamp unit is operated to move the movable mold 4 as shown in FIG. 27, whereupon both the sliding mold guide 41 and the sliding mold 3 are also moved in unison under the action of the part lock 47. If the movable mold 4 makes further movement, the elongated opening 46a in the pulling device 46 engages the pins 45 and 45a at its opposite ends and the runner plate 40 slides over the sprue bush 42 up to a predetermined position, whereby the resin sprue runner portion 33 is knocked out of the mold assembly 1 to fall free.

Next, the auxiliary fixing means 72 effects the pin 65 and the pin 66 provided with the fixing mold 2 and the runner plate, respectively so that the pins 65 and 66 are engaged with end portions of the elongated hole 67a of the pulling device 67, respectively, so as to hold the runner plate to the fixing mold 2. Further, when the movable mold 4 moves in a mold opening direction, the sliding mold guide 41 to which the sliding mold 3 is arranged is held to the runner plate 40 by the fixing means 71 and the runner plate 40 is held to the fixing mold 2 by the auxiliary fixing means 72. Therefore, the sliding mold guide 41 is not moved to excess a predetermined distance from the fixing mold 2.

Figure 28:
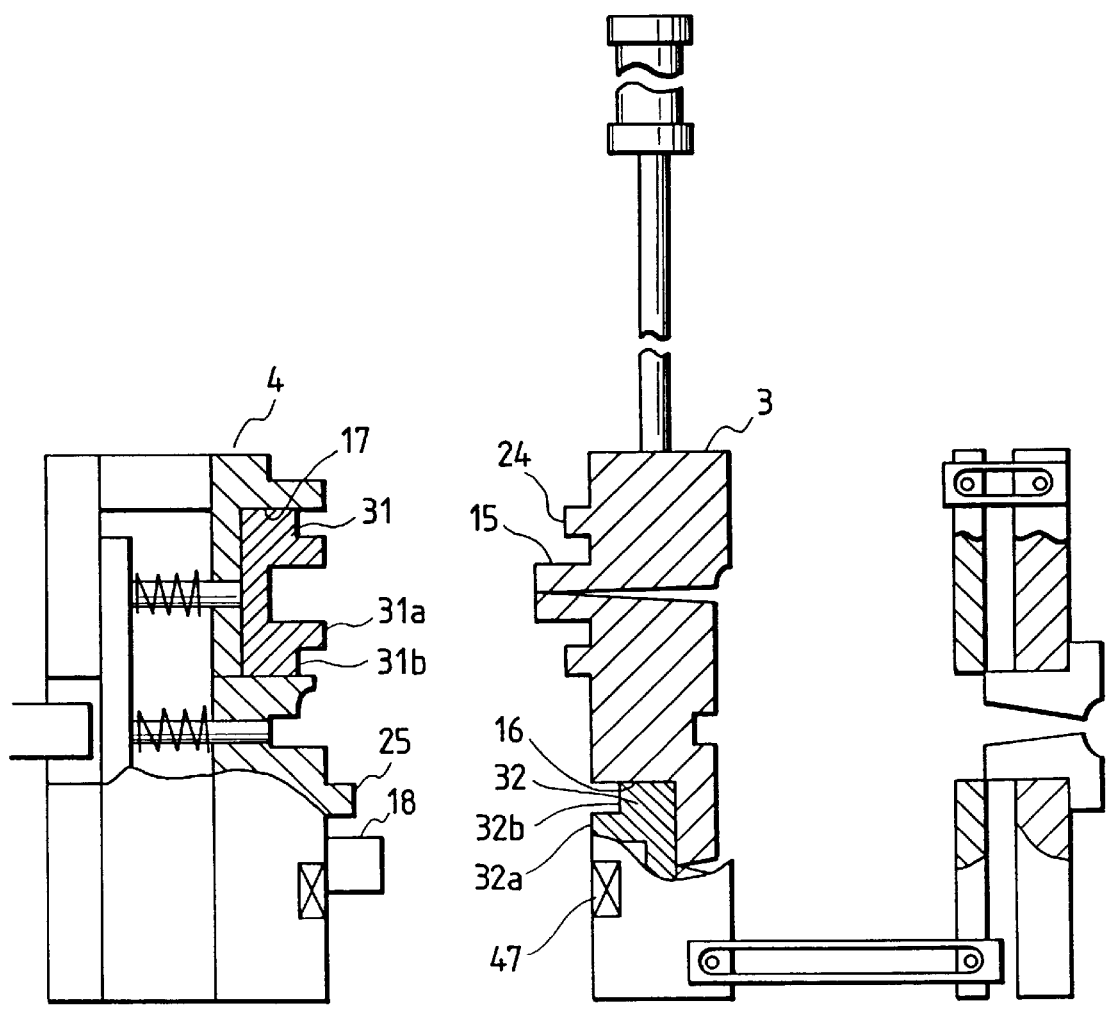
FIG. 28 is a longitudinal sectional view showing a subsequent step in the process of the fifth embodiment.

Thus, the parts lock 47 on the movable mold 4 and the sliding mold guide 41 or sliding mold 3 is released, permitting the movable mold 4 to be detached from the sliding mold 3 as shown in FIG. 28. At the same time, the male dies 15 and 18 are disengaged from the split halves 31 and 32, which will remain in the female dies 17 and 16, respectively. The thus shaped halves 31 and 32 have their end faces serve as abutting faces 31a and 32a which are to be brought into abutment against each other. Grooves 31b and 32b have been shaped in the peripheral edges of the respective abutting faces 31a and 32a by means of the projections 24 and 25 around the male dies 15 and 18.

Figure 29:
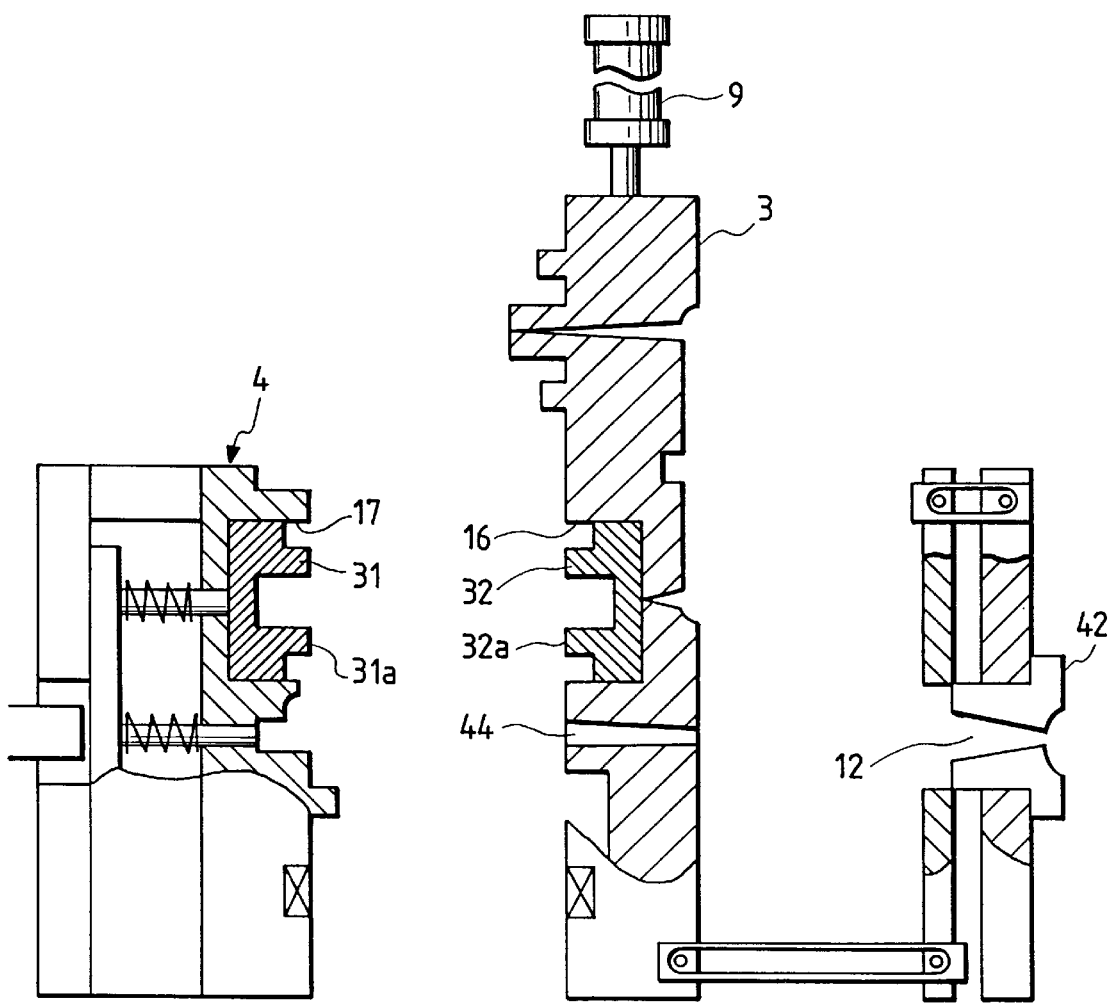
FIG. 29 is a longitudinal sectional view showing a subsequent step in the process of the fifth embodiment.

Subsequently, as shown in FIG. 29, the cylinder 9 is contracted to shift the sliding mold 3 to the upper position. Then, the female die 16 in the sliding mold 3 faces the female die 17 in the movable mold 4 so that the split half 32 left in the female die 16 will face the other split half 31 in the female die 17. In this case, the secondary sprue 44 in the lower part of the sliding mold 3 will face the sprue 12 in the sprue bush 42. The movable mold 4 is then moved toward the fixed mold 2 until it comes to the extreme end so that the two members are in registry with each other as shown in FIG. 30. As a result, the abutting faces 31a and 32a of the respective split halves 31 and 32 are brought into abutment against each other, with the grooves 31b and 32b forming a space around the abutment. This space communicates with the secondary sprue 44 via a gate 27 and a runner 21 that are formed in the movable mold 4.

If another shot of molten resin is injected from the injection unit 11, the injected resin passes through the sprue 12 in the sprue bush 42, the lower secondary sprue 44 in the sliding mold 3 and through the runner 21 and gate 27 in the movable mold 4, filling the peripheral edge portion of the abutment of the split halves 31 and 32. The peripherally injected resin 34 allows the two split halves 31 and 32 to fuse together.

Figure 32:
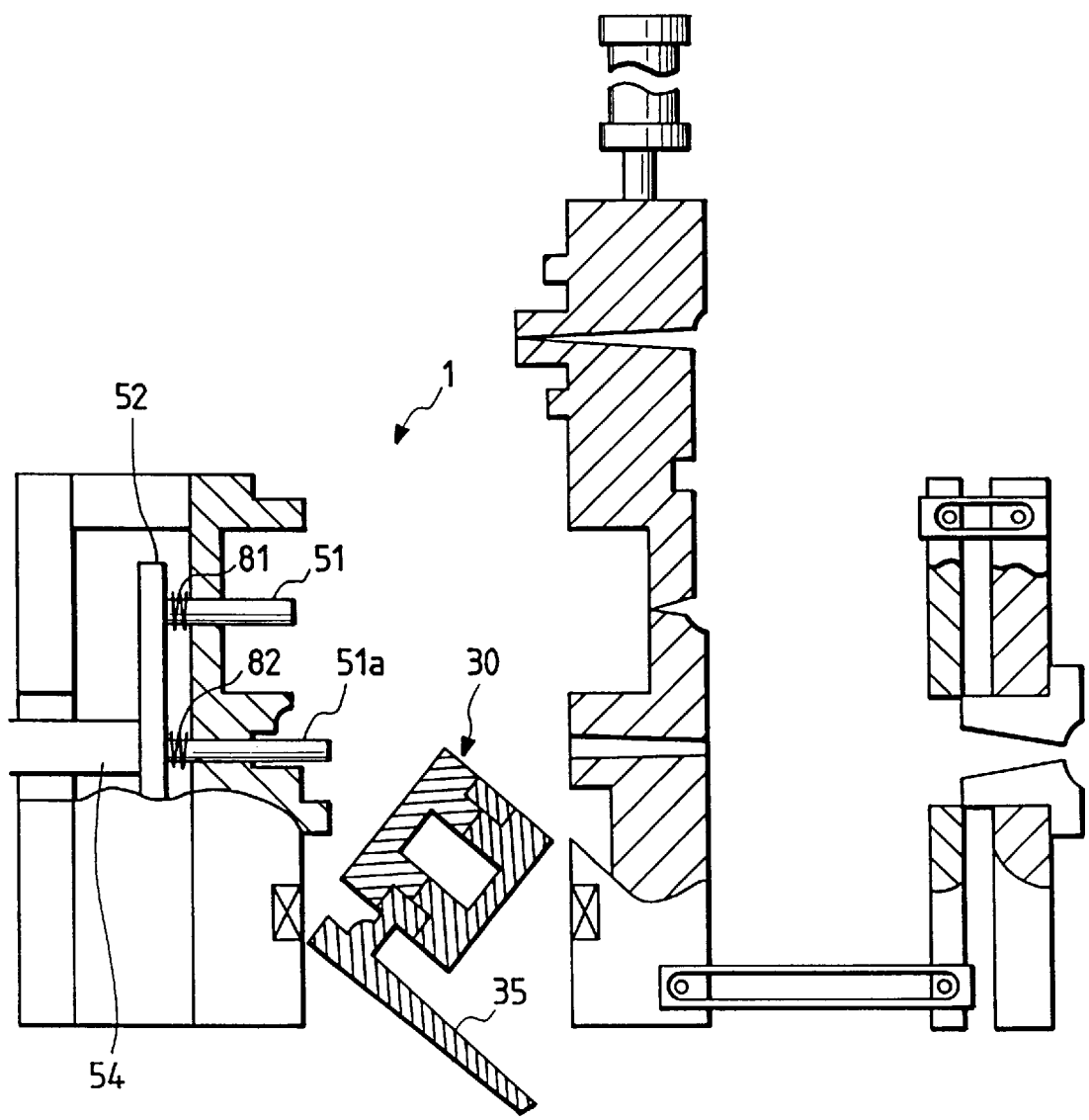
FIG. 32 is a longitudinal sectional view showing a subsequent step in the process of the fifth embodiment.
Figure 33:
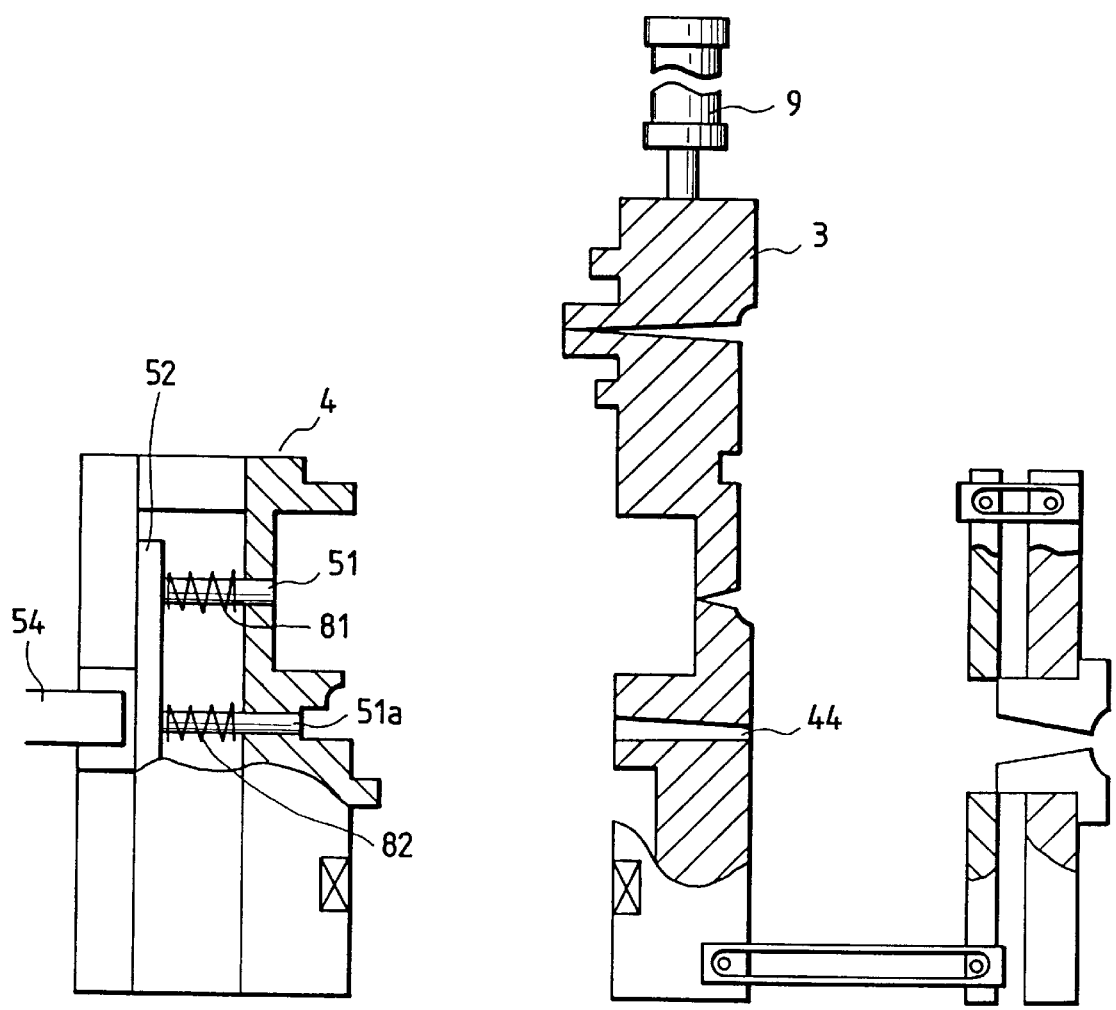
FIG. 33 is a longitudinal sectional view showing a subsequent step in the process of the fifth embodiment.

After the peripheral resin 34 is cooled to solidify, the mold clamp unit is operated again to move the mold 4 in the mold opening direction until is comes to the extreme end, whereby it is detached from the sliding mold 3. Then, as shown in FIG. 32, ejector 54 is operated from the movable plate side to move ejector pins 51 and 51a on the ejector plate 52, whereupon the completed hollow part 30 and the shaped resin sprue runner portion 35 are knocked out of the mold assembly 1 to fall free. After recovering the hollow part 30 thusly, when the ejector 54 is retracted as shown in FIG. 33, the ejector plate 52 is retracted by the effect of the springs 81 and 82 arranged around the ejector pins 51 and 51a. Then, the cylinder 9 is extended again so that the sliding mold 3 is located in the lower position. If the movable mold 4 is moved toward the fixed mold 2 until it comes to the extreme end, the process returns to the first mode shown in FIG. 25 for starting the shaping of another part.

Sixth Embodiment

Figure 34:
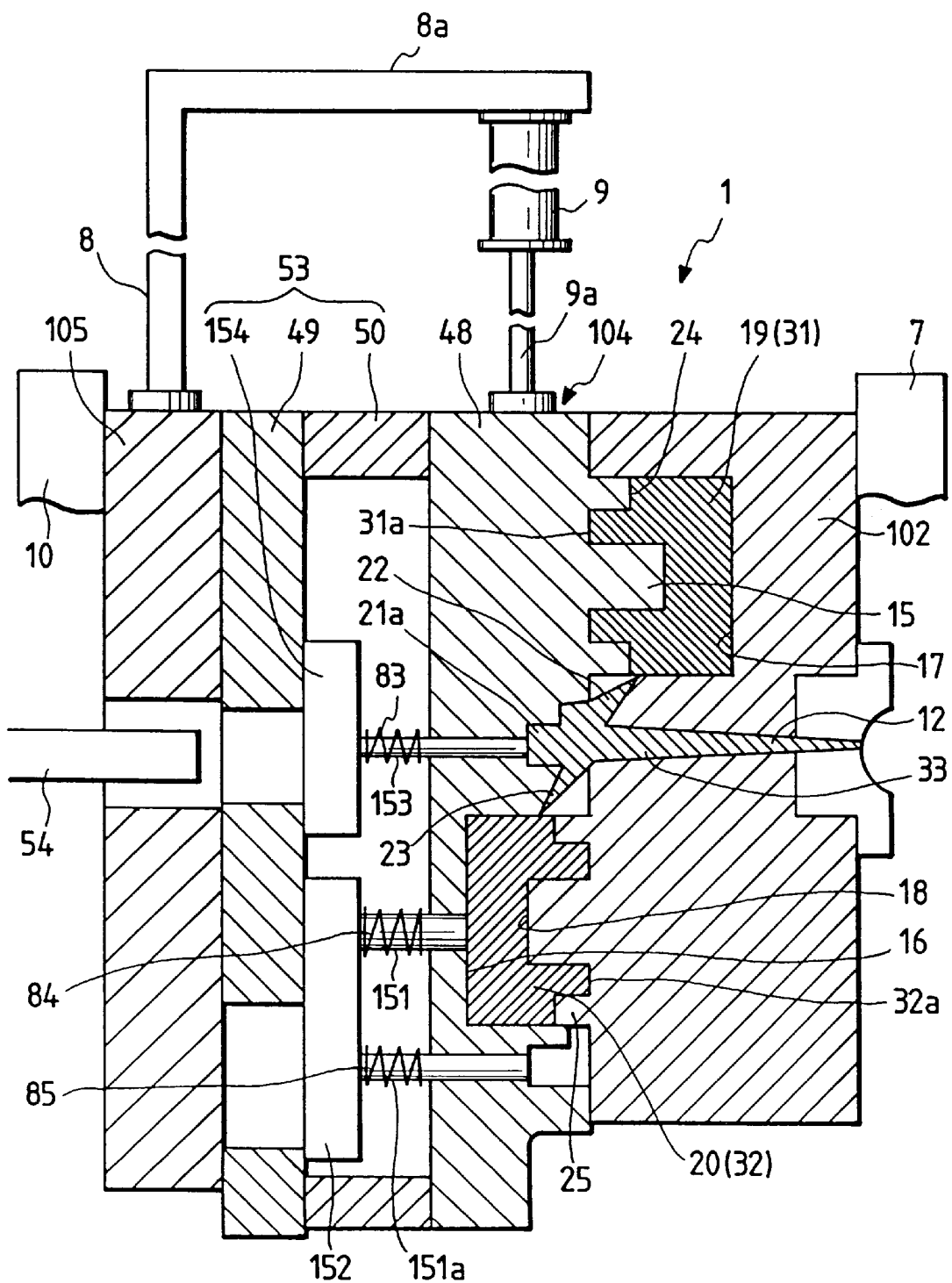
FIG. 34 is a longitudinal sectional view showing the mold assembly used to shape a hollow part in a six embodiment.
Figure 35:
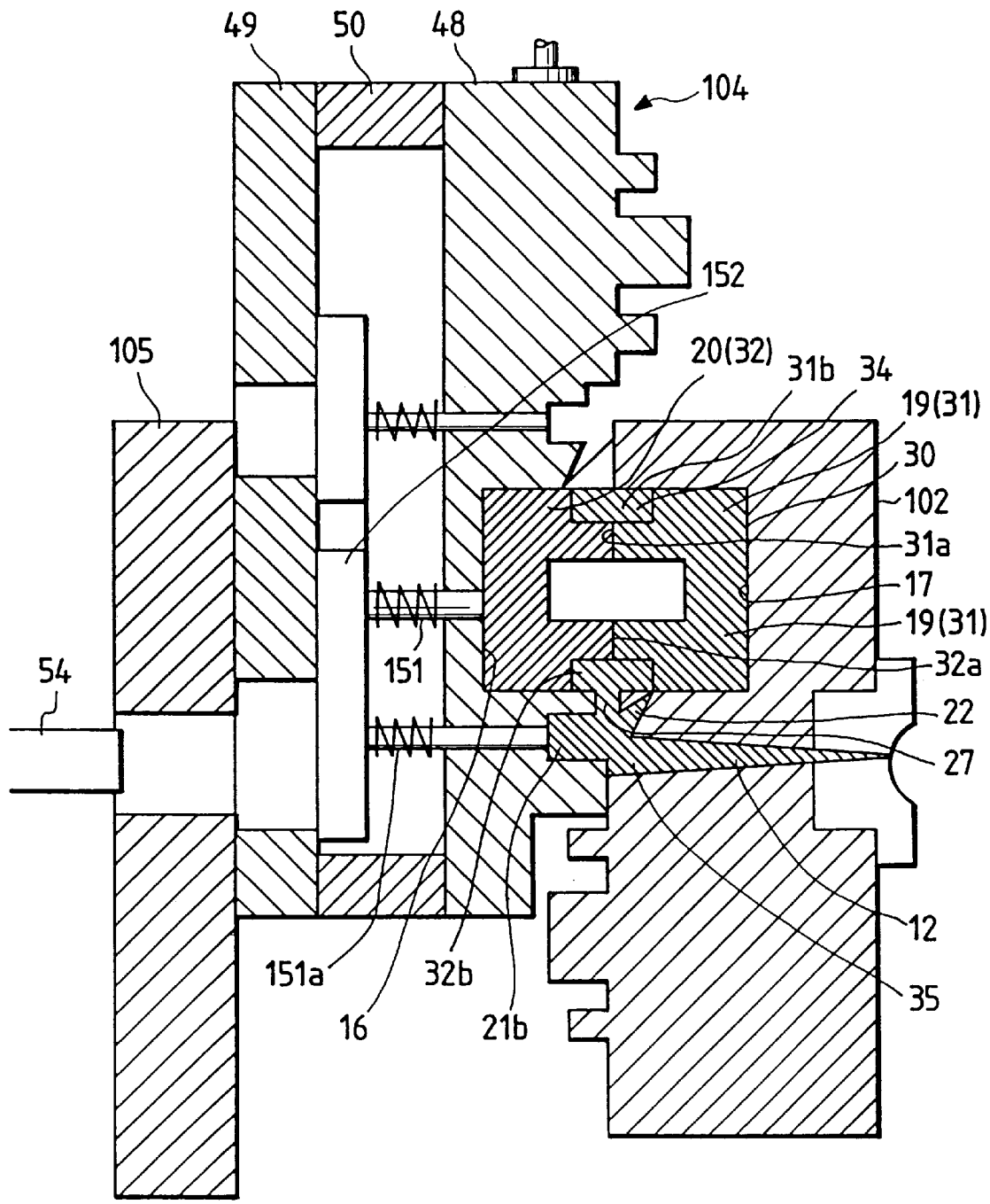
FIG. 35 is a longitudinal sectional view showing a step in the process of shaping a hollow part in the sixth embodiment.

FIGS. 34 and 35 are longitudinal sectional views showing a mold assembly for shaping hollow parts in sixth embodiment of the invention. FIG. 34 shows a step in which two split halves 31 and 32 of the desired hollow part are being shaped. FIG. 35 shows a step in which the abutting peripheral edge portions of the split halves 31 and 32 are being filled with the peripherally injected resin 34 to have them fused together to shape the desired hollow part 30.

The method of shaping a hollow part in sixth embodiment uses a mold assembly 1 consisting of two molds 102 and 104, the movable mold 104 having a male die 15 and a female die 16 for shaping two split halves 31 and 32, respectively, of the hollow part 30 and the fixed mold 102 having a female die 17 and a male die 18 that face the male die 15 and the female die 16, respectively (see FIG. 34). The method comprises the steps of:

injecting a molten resin into a pair of cavities 19 and 20 formed between the opposing male die 15 and female die 17 and between the opposing male die 18 and female die 16, thereby shaping split halves 31 and 32;

then separating the movable mold 104 from the fixed mold 102 (see FIG. 35) and sliding the former so that the split halves 31 and 32 left within the respective female dies 17 and 16 will face each other;

bringing the molds 102 and 104 into registry with each other so that the split halves 31 and 32 will abut against each other; and thereafter injecting a molten resin around the peripheral edges of the abutting faces of the respective split halves 31 and 32 so that they are fused together with the peripherally injected resin 34.

As shown specifically in FIG. 34, the mold assembly of the six embodiment comprises the fixed mold 102 having a single sprue 12 and the movable mold 104 that is capable of movement between two positions along a guide plate 105 mounted on the movable platen 10 and which is adapted for registering with the fixed mold 102.

The movable mold 104 comprises a mold portion 48 having the male die 15 and the female die 16 and an ejector box 53; the ejector box 53 comprises a coupling portion 49 coupled to the guide plate 105, an intermediate member 50 for providing a given space between the mold portion 48 and the coupling portion 49, and two ejector plates 152 and 154 provided in the space, one ejector plate 152 having ejector pins 151 and 151a and the other ejector plate 154 an ejector pin 153. Ejector plate 152 and 154 is retracted by springs 84, 85 and 86 arranged around the ejector pins 151, 151a and 153 when the ejecting operation is finished.

A support 8 having a horizontal arm 8a is erected on top of the guide plate 105. The underside of the horizontal arm 8a is furnished with a hydraulically, pneumatically or otherwise operated sliding cylinder 9. The cylinder may be replaced by an electric motor. The cylinder 9 has a piston rod 9a connected to the top of the movable mold 104. Thus, the movable mold 104, as it keeps adhering to the principal face of the guide plate 105, is capable of sliding vertically between the lower position where the cylinder 9 is extended fully and the upper position where it is contracted fully.

The movable mold 104 is mounted, via guide plate 105, on the movable platen 10 which is supported on the bed of an injection molding machine (not shown) in a horizontally movable manner. The movable platen 10 is adapted to be moved back and forth with respect to the fixed platen 7 by means of a mold clamping unit not shown. Thus, the movable mold 104 is adapted to be moved back and forth between the mold registering position where it adheres to the fixed mold 102 and the mold opening position where it is detached from the fixed mold 102.

The movable mold 104 has not only the male die 15 and the female die 16 for shaping two split halves 31 and 32, respectively, of the hollow part but also runners 21a and 21b that are continuous to the sprue 12 in the fixed mold 102 at the two positions.

The fixed mold 102 has the female die 17 and the male die 18 which, when the movable mold 104 is located at one of the two positions (see FIG. 34), face the male die 15 and the female die 16, respectively, in the mold 104, and the female die 17 is adapted to face the female die 16 in the mold 104 when the latter has moved to the other position (see FIG. 35).

The runner 21a is adapted to communicate with the end edge portions of the female dies 16 and 17 via gates 23 and 22, respectively, when it is continuous to the sprue 12 in the fixed mold 102 (see FIG. 34). On the other hand, the runner 21b is adapted to communicate with the edge portions of the female dies 16 and 17 via gate 27 when it is continuous to the sprue 12 (see FIG. 35).

In addition, the male dies 15 and 18 have projections 24 and 25 that shape grooves 31b and 32b around the peripheral edges of the abutting faces 31a and 32a of the respective split halves 31 and 32.

The given space provided in the ejector box 53 of the movable plate 104 contains both ejector plates 152 and 154. As shown in FIG. 34, the ejector plate 154 has ejector pin 153 which knocks out of the mold assembly 1 the resin sprue runner portion 33 which forms when the cavities 19 and 20 for shaping the respective split halves 31 and 32 are filled with a molten resin. On the other hand, as shown in FIG. 35, the ejector plate 152 has ejector pins 151 and 151a by which the resin sprue runner portion 35 that forms as a result of filling the abutting peripheral edge portions of the split halves 31 and 32 with the peripherally injected resin 34 and the hollow part 30 shaped by fusing those split halves together are respectively knocked out of the mold assembly 1. It should be noted that both ejector plates 152 and 154 are operated by means of the ejector 54 provided on the movable platen 10.

The mold assembly 1 of the sixth embodiment is operated in the following manner. After the split halves 31 and 32 are formed as shown in FIG. 34, the mold clamp unit is operated to detach the movable mold 104 from the fixed mold 102. In this mold opening mode, the resin sprue runner portion 33 which has solidified within the sprue 12, runner 21a, etc. in the mold assembly 1 is knocked out of the latter by means of the ejector pin 153 on the ejector plate 154 and falls free as a result of separation in those areas of the portion 33 which correspond to the gates 22 and 23. After falling the resin sprue runner portion 33, when the ejector 54 is retracted, the ejector plate 154 is retracted by the effect of the spring 83 arranged around the ejector pin 153.

Further, as shown in FIG. 35, the split halves 31 and 32 are fused together with the peripherally injected resin 34 and, subsequently, the mold clamp unit is operated again to detach the movable mold 104 from the fixed mold 102. Namely, after recovering the completed hollow part 30, whne the ejector 54 is retracted, the ejector plate 152 is retracted by the effect of the spring 84 and 85 arranged around the ejector pins 151, 151a.

In this mold opening mode, the completed hollow part 30 and the resin sprue runner portion 35 which has solidified within the sprue 21, runner 21b, etc. in the mold assembly are knocked out of the latter by means of the ejector pins 151 and 151a, respectively, on the ejector plate 152 and fall free.

Seventh Embodiment

Figure 36:
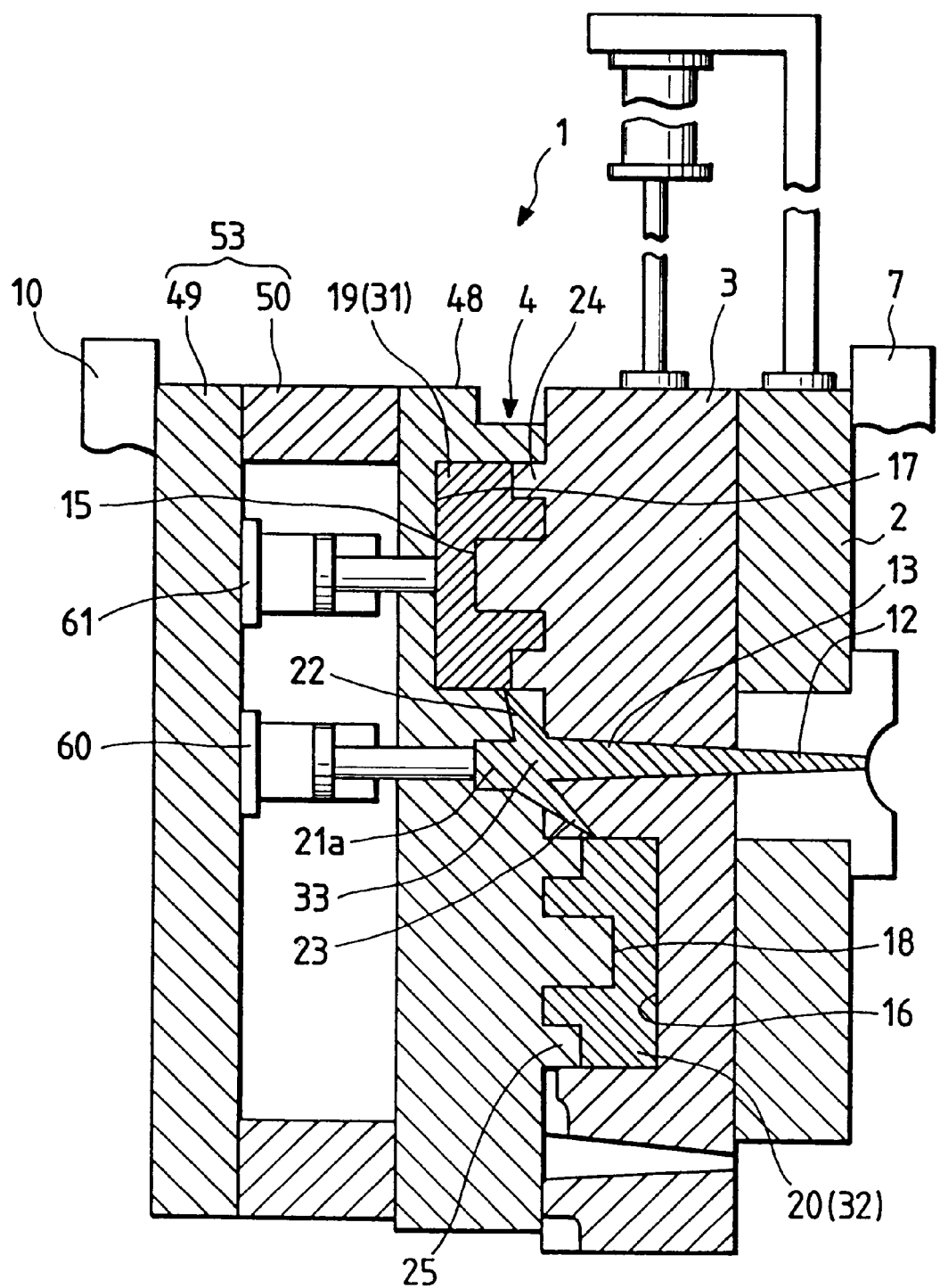
FIG. 36 is a longitudinal sectional view showing the mold assembly used to shape a hollow part in a seventh embodiment.
Figure 37:
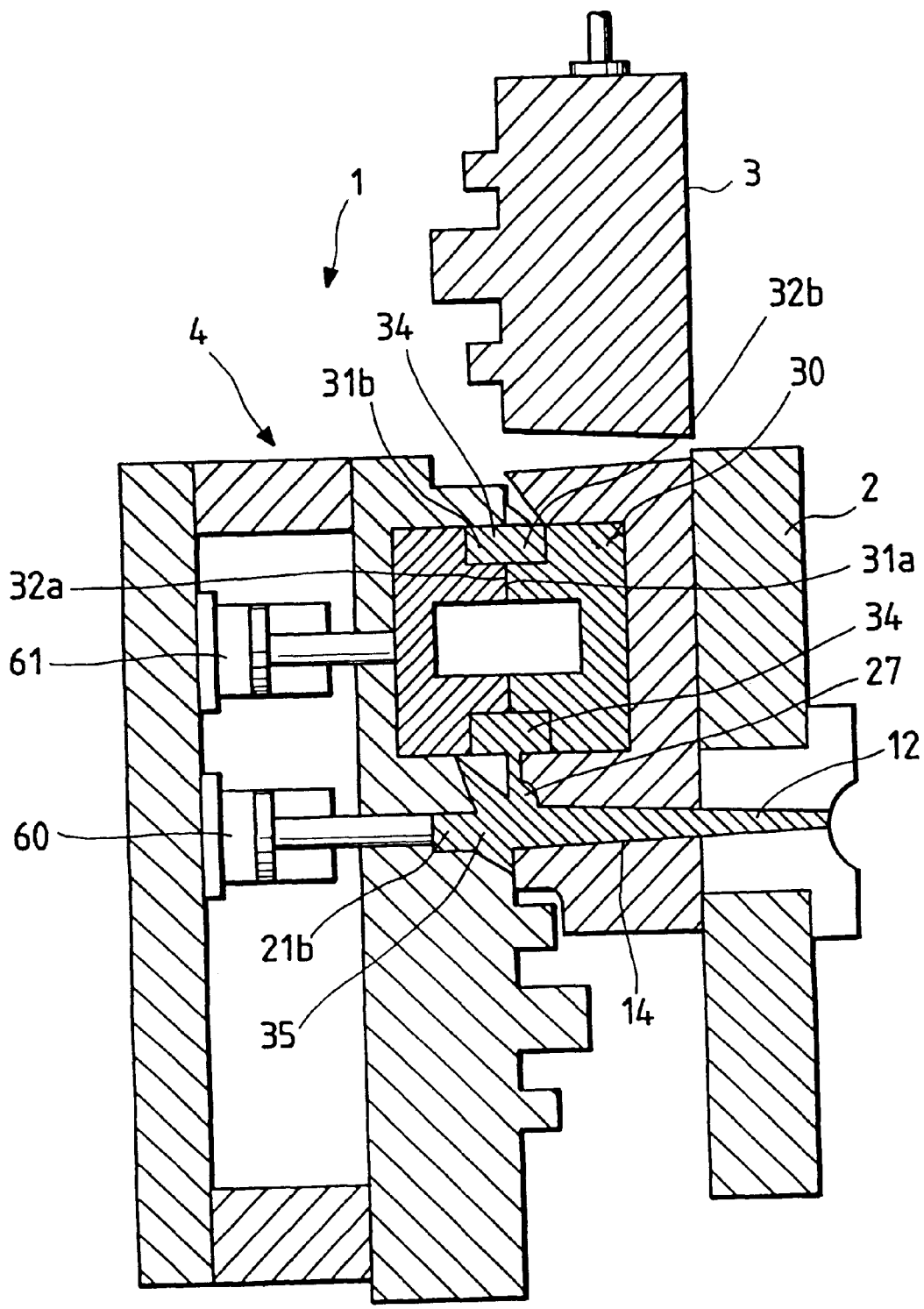
FIG. 37 is a longitudinal sectional view showing a step in the process of shaping a hollow part in the seventh embodiment.

FIGS. 36 and 37 are longitudinal sectional views showing a mold assembly for shaping hollow parts in Seventh embodimemt of the invention. FIG. 36 shows a step in which two split halves 31 and 32 of the desired hollow part are being shaped. FIG. 37 shows a step in which the abutting peripheral edge portions of the split halves 31 and 32 are being filled with the peripherally injected resin 34 to have them fused together to shape the desired hollow part 30.

The movable mold 4 comprises a mold portion 48 having the male die 18 and the female die 17 and an ejector box 53. The ejector box 53 comprises a coupling portion 49 coupled to the movable platen 10, and an intermediate portion 50 for providing a given space between the mold portion 48 and the coupling portion 49. Provided in this space are two cylinders 60 and 61; the cylinder 60 knocks the resin sprue runner portions 33 and 34 out of the mold assembly; as shown in FIG. 36, the sprue runner portion 33 is formed when the cavities 19 and 20 for forming split halves 31 and 32 are filled with the molten resin via the sprue 12, runner 21a and gates 22 and 23 and, as shown in FIG. 37, the sprue runner portion 35 is formed by filling the abutting peripheral edge portions of the split halves 31 and 32 with the peripherally injected resin 34 via the sprue 12, runner 21b and the gate 27 in the sliding mold. On the other hand, the cylinder 61 knocks the hollow part 30 out of the mold assembly 1 after it is shaped by fusing the split halves 31 and 32 together (see FIG. 37). The cylinders 61 and 62 are hydraulically, pneumatically or otherwise operated. If desired, they may be replaced by electric motors.

The mold assembly 1 of the seventh embodiment is operated in the following manner. After the split halves 31 and 32 are formed as shown in FIG. 36, the mold clamp unit is operated to detach the movable mold 4 from the sliding mold 3. In this mold opening mode, the resin sprue runner portion 33 which has solidified within the sprue 12, runner 21a, etc. in the mold assembly 1 is knocked out of the latter by means of the cylinder 60 and falls free as a result of separation in those areas of the portion 33 which correspond to the gates 22 and 23.

Further, as shown in FIG. 37, the split halves 31 and 32 are fused together with the peripherally injected resin 34 and, subsequently, the mold clamp unit is operated again to detach the movable mold 4 from the sliding mold 3.

In this mold opening mode, the competed hollow part 30 is knocked out of the mold assembly by means of the knockout cylinder 61 whereas the resin sprue runner portion 35 is knocked out by the knockout cylinder 60.

It should be noted here that in the fifth and sixth embodiments already described, determination as to whether or not the resin sprue runner portion 33 which has been formed as a result of filling the respective cavities 19 and 20 with a molten resin should be knocked out of the mold assembly by means of the single ejector 54 is made via a selector switch.

Having these characteristic features, the injection molding method and apparatus of the present invention offers the following advantages. Namely, alternately moving molds are provided with different sets of shaping conditions using a single common injection unit and cylinder and this insures that the quality of the parts that are shaped alternately can be controlled in a desired and optimal manner and that even two shaped parts, one of which is on the right side and symmetrical with the other which is on the left side, can be easily produced in large quantities.

Having the features described herein, the present invention enables the production of a hollow part into which an insert such as a stopper is fitted automatically in one step of the shaping process. In addition, the two shaped halves of the hollow part may be adapted to have different colors or to be made from different materials and this helps the user to identify the chemical, medicine or other contents of the hollow part from outside. Thus, the present invention can attain the heretofore unreachable goal of shaping two-colored hollow parts in large quantities at low cost.

As described on the foregoing pages, the method of the present invention comprises: primary shaping to form a pair of halves of the final hollow part to be produced, each one half having corresponding projections and recesses in the joining end portion; injecting a molten resin into the space defined by the projections and recesses as the two joining end portions are spaced from each other; narrowing the space to compress the injected molten resin before it solidifies; and fusing the joined portions of the pair of halves to yield the desired hollow part.

The method according to the present invention comprises: primary shaping to form a pair of halves of the final hollow part, each one half having a recess formed in the joining end portion; bringing the respective joining end portions into abutment against each other; injecting a molter resin into a runner portion communicating with the space defined by the recesses in the two halves; and compressing the runner portion so that the molten resin in the runner portion fills the space, whereby the joined portions of the pair of halves are fused together to yield desired hollow part.

In either case, the invention offers the following unique advantages.

(1) The molten resin is injected either into the space defined by the projections and recesses in the joining end portions of the pair of halves of the final hollow part or into the runner portion. The first-mentioned space is comparatively wide since it is defined by the projections and recesses in the two halves as they are spaced from each other whereas the runner portion is not where fusion takes place. This allows the molten resin to be injected at lower pressures. Hence, there is no possibility for the two halves A and B to deform under high injection pressure. The low injection pressure also eliminates the chance of the molten resin of leaking into the final hollow part.

(2) The molten resin which has been injected into the space defined by the projections and recesses in the joining end portions of the pair of halves of the final hollow part will fuse to join those end portions together as the space is compressed. Alternatively, the molten resin which has been injected into the runner portion will fill the fusion space to join the two halves as the runner portion is compressed. In either case, the possibility of the occurrence of "short shot" is eliminated.

Further, a cavity plate or a plunger and this offers the advantage of achieving "gate cutting" in the mold when the cavity plate or the plunger is driven to compress the injected molten resin.

(3) Being based on the injection molding technique, the invention retains the advantage characteristic of injection molding, namely, the shaping of completely sealed hollow parts. At the same time, the invention insures the shaping of hollow parts of a uniform wall thickness. Another advantage of the invention is its ability to produce complexly shaped parts.

According to the present invention, the runner plate is used in combination with the ejector plate and this offers the advantage that a single ejector need be operated only once. In addition, split halves of a desired hollow part are shaped by injecting a molten resin through the primary sprue in the sliding mold and this offers the advantage of optimizing the gate dimensions in accordance with the specific type of the hollow part to be shaped. After the shaped split halves are brought into abutment against each other, a molten resin as supplied through the secondary sprue in the sliding mold is injected around the peripheral edges of the abutting faces via the runner and the gate that are provided in the movable mold and this offers the added advantage of optimizing the dimensions of the gate.

According to the present invention, two ejector plates are used and either can be operated with a single ejector. After the shaped split halves are brought into abutment against each other, a molten resin is injected around the peripheral edges of the abutting faces via the runner and the gate that are provided in the movable mold and this again offers the advantage of optimizing the dimensions of the gate.

As a further advantage, the movable mold which is mounted on the moving platen contributes to efficient mold maintenance and operation.

According to the present invention, the use of two cylinders and this eliminates the need of using an ejector. Moreover, a molten resin is injected around the peripheral edges of the abutting faces of two split halves via the runner and the gage that are provided in the movable mold and this offers the same advantage of optimizing the dimensions of the gate.

According to the present invention, determination as to whether or not the resin sprue runner portion that has been formed as a result of filling the respective cavities with a molten resin should be knocked out of the mold assembly by means of the single ejector is made via a selector switch. Hence, different types of mold assembly, such as those used in the fifth and sixth embodiments, can be selectively operated on a selector switch.

As described herein, all methods of the present invention for shaping hollow parts and all mold assemblies to be used in those methods are applicable to injection molding machines of a type that is equipped with a single ejector and this permits the use of various mold types depending upon the specific kinds of the hollow parts to be shaped.

What is claimed is:

1. A mold assembly for secondary shaping of a hollow part after primary shaping is performed, said primary shaping including forming split halves of a mold by bringing a sliding mold and a movable mold into a mold registry position such that a male die and a female die of said sliding mold, and a female die and a male die of said movable mold, respectively, face each other and form a pair of cavities into which a mold material is injected to form a first split half and a second split half, said mold assembly comprising:

a moving die which acts as said sliding mold in said primary shaping, and which includes said first split half having a recessed body and an upper and a lower annular peripheral portion projecting from respective upper and lower portions of said body;

a movable frame which moves toward said moving die and away from said moving die, said movable frame having an integral movable member;

a cavity plate disposed between said moving die and said movable frame and which moves in an axial direction, said cavity plate including said second split half having a recessed body and an upper and a lower annular peripheral portion projecting from respective upper and lower portions of said body;

said moving die having a locating ring which communicates with a sprue formed in said moving die, said sprue which communicates with a plurality of cavities disposed in said moving die;

a tubular member disposed within a central portion of said cavity plate and provided on an outer peripheral portion of said movable member for guiding said cavity plate;

wherein said cavity plate is movable in one of a direction toward and away from said movable member;

wherein said first split half includes a first upper and first lower distal end projecting portion which project in a direction normal to said respective upper and lower annular projecting portions, and said second split half includes a second upper and second lower distal end projecting portion each having a cutout, said respective second upper and lower distal end projecting portion projecting in a direction normal to said respective upper and lower annular projecting portions;

wherein when said first split half and said second split half are brought into abutment with each other, said first and second upper and lower distal end projecting portions overlap each other along a length of each cutout of said first and second upper and lower distal end projecting portions, to form annular grooves at peripheral edges of abutting faces of said respective first and second split halves.

2. A mold assembly for secondary shaping of a hollow part after primary shaping is performed, said primary shaping including forming split halves of a mold by bringing a sliding mold and a movable mold into mold registry position such that a male die and a female die of said sliding mold, and a female die and a male die of said movable mold, respectively, face each other and form a pair of cavities into which a mold material is injected to form a first split half and a second split half, said mold assembly comprising:

a moving die which includes said first split half having a recessed body and two arm members;

a movable die which moves toward said moving die and away from said moving die, said movable die including said second split half having a recessed body and two arm members;

a compressing member having a plunger portion, said compressing member being provided within said movable die such that it moves in an axial direction;

a movable frame which moves toward and away from said movable die, said movable frame having said movable die as an integral member;

said movable die having an annular runner portion formed over a predetermined width in an axial direction;

wherein each said arm member of each said split half includes an upper and a lower bifurcated joining portion, each said bifurcated joining portion including a distal end portion which extends outwardly in a straight line from each said arm member of each said split half, and a hook portion which branches outward at a base of said distal end portion, said distal end portion having a longer length than a length of said hooked projecting portion; and wherein when said first split half and said second split half are brought into abutment with each other, an open gate is formed by said abutted distal end portions and by said spaced apart hook portions, said annular runner portion communicating with said gate; and wherein said plunger of said compressing member is movable in said axial direction and is inserted into said annular runner portion to close said open gate.

3. A mold assembly for shaping of a hollow part comprising:

a fixed mold mounted on a fixed platen, and having a single sprue;

a runner plate disposed between said fixed mold and said sliding mold;

a sliding mold capable of vertical movement between a first position and a second position, said sliding mold having an upper sub-sprue and a lower sub-sprue, said upper sub-sprue being provided continuous with said sprue of said fixed mold when said sliding mold is in said first position, and said lower sub-sprue being provided continuous with said sprue of said fixed mold when said sliding mold is in said second position;

wherein said upper sub-sprue is longer than said lower sub-sprue;

a sliding mold guide on which said sliding mold is arranged;

a movable mold mounted on a movable platen and movable in a horizontal direction toward a mold registry position wherein said movable mold, said sliding mold, said runner plate and said fixed mold are in unitary assembly, and away from a mold registry position wherein said movable mold moves apart from said sliding mold;

said sliding mold further comprising a male die and a female die for shaping split halves, respectively, of the hollow part, and said movable mold further comprising a female die and a male die for shaping said split halves, respectively, of the hollow part;

wherein in said first position, said sliding mold and said movable mold are brought into said mold registry position such that said male die and said female die of said sliding mold and said female die and said male die of said movable mold, respectively, face each other and form a pair of cavities, said sprue of said fixed mold communicating with both said upper sub-sprue and said lower sub-sprue of said sliding mold;

said sliding mold being capable of horizontal movement between a third position wherein said sliding mold is removed from said mold registry position by removing said sliding mold from said fixed mold while said sliding mold is still connected to said movable mold, and a fourth position, wherein said sliding mold is removed from said movable mold to stand apart from said movable mold and said fixed mold;

said male die of said sliding mold and said male die of said movable mold having projections that shape grooves around peripheral edges of abutting faces of the respective split halves; and wherein in said second position, said first split half and said second split half are brought into abutment with each other to form annular grooves at peripheral edges of abutting faces of the respective first and second split halves.

4. The mold assembly for shaping of a hollow part according to claim 3, further comprising means for fixing said sliding mold guide to said runner plate.

5. The mold assembly for shaping of a hollow part according to claim 4, wherein said fixing means comprises:

a plurality of pins respectively provided in a horizontal direction on said runner plate and said sliding mold guide; and a pulling mechanism comprising an elongated hole which is engaged with said pins.

6. The mold assembly for shaping of a hollow part according to claim 3, wherein said movable mold further comprises an ejector box, said ejector box comprising:

a coupling portion coupled to said movable platen;

an intermediate member for providing a space between said female die, said male die, said ejector box, and said coupling portion; and an ejector plate provided in said space and having ejector pins for knocking out the hollow part and a resin sprue runner portion formed as a result of solidification within said sprue and said lower sub-sprue.

7. The mold assembly for shaping of a hollow part according to claim 6, wherein a determination as to whether said resin sprue runner portion which has been formed as a result of filling the respective cavities with said resin should be knocked out of said mold assembly by said ejector plate, is made via a selector switch.

8. A mold assembly for shaping of a hollow part comprising:

a fixed mold comprising a male die and a female die for shaping split halves, respectively, of the hollow part, said fixed mold having a single sprue;

a movable mold which is movable along a guide plate mounted on a movable platen, said movable mold comprising a female die and a male die for shaping split halves, respectively, of the hollow part;

said movable mold being capable of vertical movement along said guide plate between a first position and a second position;

wherein in said first position, said movable mold is movable in a horizontal direction toward a mold registry position and away from a mold registry position with said fixed mold;

wherein in said mold registry position, said male die and said female die of said fixed mold and said female die and said male die of said movable mold, respectively, face each other and form a pair of cavities; and wherein in said first position, a first runner disposed in said movable mold is adapted to communicate with end edge portions of said female die in said movable mold and said female die in said fixed mold, said first runner being continuous with said sprue in said fixed mold;

said male die of said fixed mold and said male die of said movable mold having projections that shape grooves around peripheral edges of abutting faces of the respective split halves; and wherein in said second position, said first split half and said second split half are brought into abutment with each other to form said annular grooves at said peripheral edges of said abutting faces of the respective first and second split halves; and wherein in said second position, a second runner disposed in said movable mold is adapted to communicate with edge portions of said female die in said movable mold and said female die in said fixed mold, said second runner being continuous with said sprue in said fixed mold.

9. The mold assembly for shaping of a hollow part according to claim 8, wherein said movable mold further comprises an ejector box, said ejector box comprising:

a coupling portion coupled to said guide plate;

an intermediate member for providing a space between said female die, said male die, said ejector box, and said coupling portion; and a first ejector plate and a second ejector plate being provided in said space, said first ejector plate having an ejector pin being retracted by springs disposed around said ejector pin, said ejector pin which knocks out a resin sprue runner portion which forms when said cavities for shaping the respective split halves are filled with resin;

said second ejector plate having a plurality of ejector pins being retracted by springs disposed around said ejector pins, said ejector pins which knock out the hollow part and a resin sprue runner formed as a result of filling said abutting peripheral edge portions of the split halves with resin.

10. The mold assembly for shaping of a hollow part according to claim 9, wherein a determination as to whether said resin sprue runner portion which has been formed as a result of filling the respective cavities with said resin should be knocked out of said mold assembly by said second ejector plate, is made via a selector switch.

11. A mold assembly for shaping of a hollow part comprising:

a fixed mold having a single sprue;

a sliding mold comprising a male die and a female die for shaping split halves, respectively, of the hollow part, said sliding mold being movable in a vertical direction between a first position and a second position;

a movable mold which is mounted on a movable platen, said movable mold comprising a female die and a male die for shaping split halves, respectively, of the hollow part;

said movable mold being capable of moving in a horizontal direction toward a mold registry position and away from a mold registry position with said sliding mold;

wherein in said mold registry position, said male die and said female die of said sliding mold and said female die and said male die of said movable mold, respectively, face each other and form a pair of cavities; and wherein in said first position, a first runner disposed in said sliding mold is adapted to communicate with end edge portions of said female die in said movable mold and said female die in said sliding mold, said first runner being continuous with said sprue in said fixed mold;

said male die of said sliding mold and said male die of said movable mold having projections that shape annular grooves around peripheral edges of abutting faces of the respective split halves; and wherein in said second position, said first split half and said second split half are brought into abutment with each other to form said annular grooves at said peripheral edges of said abutting faces of the respective first and second split halves; and wherein in said second position, a second runner disposed in said sliding mold is adapted to communicate with edge portions of said female die in said sliding mold and said female die in said fixed mold, said second runner being continuous with said sprue in said fixed mold.

12. The mold assembly for shaping of a hollow part according to claim 11, wherein said movable mold further comprises an ejector box, said ejector box comprising:

a coupling portion coupled to said movable platen;

an intermediate portion for providing a space between said female die, said male die, said ejector box, and said coupling portion; and a first cylinder and a second cylinder being provided in said space, said first cylinder which knocks out a resin sprue runner which forms when said cavities for shaping the respective split halves are filled with resin;

said second cylinder which knocks out the hollow part out of the mold assembly and said first cylinder which knocks out a resin sprue runner portion formed as a result of filling said abutting peripheral edge portions of the split halves with resin, after said mold assembly is shaped by fusing said split halves together.

* * * * *